United States Patent
Homier et al.

(10) Patent No.: US 7,921,043 B2
(45) Date of Patent: Apr. 5, 2011

(54) INTELLIGENT RECONCILIATION OF DATABASE TRANSFER ERRORS

(75) Inventors: Matthew J. Homier, San Francisco, CA (US); Katherine A. Welker, San Carlos, CA (US)

(73) Assignee: Intuit Inc., Mountain View, CA (US)

( * ) Notice: Subject to any disclaimer, the term of this patent is extended or adjusted under 35 U.S.C. 154(b) by 775 days.

(21) Appl. No.: 11/193,906

(22) Filed: Jul. 28, 2005

(65) Prior Publication Data

US 2007/0027782 A1    Feb. 1, 2007

(51) Int. Cl.
*G06Q 40/00*    (2006.01)

(52) U.S. Cl. .......................................................... 705/35

(58) Field of Classification Search ...................... 705/35
See application file for complete search history.

(56) References Cited

U.S. PATENT DOCUMENTS

| | | | | |
|---|---|---|---|---|
| 5,134,564 | A * | 7/1992 | Dunn et al. ...................... | 705/33 |
| 5,220,501 | A * | 6/1993 | Lawlor et al. ................... | 705/40 |
| 2002/0099633 | A1* | 7/2002 | Bray ............................... | 705/35 |
| 2002/0184133 | A1* | 12/2002 | Zangari et al. .................. | 705/36 |
| 2005/0187852 | A1* | 8/2005 | Hwang ............................ | 705/36 |
| 2007/0130028 | A1* | 6/2007 | Provinse ......................... | 705/27 |

* cited by examiner

*Primary Examiner* — James A Kramer
*Assistant Examiner* — Eric T Wong
(74) *Attorney, Agent, or Firm* — Osha • Liang LLP

(57) ABSTRACT

A method and mechanism identify various discrepancies that commonly arise when downloading transactional data from one database to another, and provide an ordered sequence of user interface tools to correct each type of discrepancy.

17 Claims, 25 Drawing Sheets

Investment Manager

File  Edit  View  Favorites  Tools  Help

Welcome, Customer Name                Logout  Help & Support

AccountManager

Clients | Investments                  Import | My Settings | Invoices | Reports

Clients   Total assets: $39,020,768.00 ($338,916,850.00 securities + $109,918.00 cash)

Client list | View: Holdings value ▼  — 360

Find [       ] Find

X Export  Print

<< New displaying clients 1-50 of 73>>

| Last name | Client name | Security value | Cash value | Total value |
|---|---|---|---|---|
| Abbott | David and Michele Abbott | $899,877.00 | $988.00 | $900,875.00 |
| Adams | Gregory and Alicia Adams | $400,887.00 | $599.00 | $401,486.00 |
| Albert | Ronald and Kelly Albert | $831,980.00 | $1,344.00 | $833,324.00 |
| Anderson | Steven and Lisa Anderson | $599,888.00 | $544.00 | $600,432.00 |
| Andrews-Samole | Rick and Eileen Andrews-Samole | $343,821.00 | $900.00 | $344,721.00 |
| Arjuna | Aaron Arjuna | $674,873.00 | $788.00 | $675,660.00 |
| Arnold | Eileen and Tom Arnold | $831,980.00 | $234.00 | $632,214.00 |

AccountManager

Welcome, Customer Name

Logout | Help & Support

Import | My Settings | Invoices | Reports

Clients | Investments

Investments — Security prices as of close May 9, 2005

Security list | View: Value ▼

Find: [____] Find

X Export  Print

<< New displaying securities 1-50 of 140 >>

| Name △ | Symbol | Price (460 — Sort by current share price) | Total Shares | Total Value |
|---|---|---|---|---|
| 1st Constitution Bancorp (NJ) | FCCY | $8.24 | $4,112.00 | $223,117.00 |
| Advance Capital Equity Growth Fund | ADEGX | $11.58 | $5,412.00 | $44,594.90 |
| Advantus Bond CL A | ADFSX | $11.58 | $541.00 | $6,264.78 |
| Advisor High Income Muni Class B | FAIBX | $87.42 | $1,220.00 | $14,127.60 |
| Aggressive Growth Fund | DEGX | $54.96 | $221.00 | $19,319.80 |
| AIM Aggressive Growth CL A | AAGFX | $54.96 | $2,214.00 | $121,681.00 |
| AIM Aggressive Growth CL B | AAGBX | | $1,002.00 | $54,368.50 |

Investment Manager

File  Edit  View  Favorites  Tools  Help

Address  http://www.accountsupervisor.com/project/mattsplace/

AccountManager

Welcome, Customer Name

Logout  Help & Support

Import  My Settings | Reports

Clients | Investments

Transaction Assistant | Approval Required

Reconciling transactions |

The transactions listed require approval before they are processed. You have set this as a preference in the My Settings area.

1. Review the pending transactions.
2. Select the checkboxes of the transactions you wish to approve.
3. Click the Approve button. The selected transactions will be added to the Approved for posting tab.
4. To process the approved transaction, go to the Approved for posting tab. Click the Repost all button to process all the transactions, or use the checkboxes and Repost button to only post a subset. You will receive an email when once finished.
5. Click the Finish button to return to the Import area.

| | Pending (5) | | 2 Approved for posting (2) | | | | | Next step | Finish later |
|---|---|---|---|---|---|---|---|---|---|
| | Approve | Approve all | | | | | | | |
| | | Date | Action | Security | Shares | Price | Fees | Cost | Client/Account |
| Edit | ☐ | 0/0/00 | Buy | AAAX | 10 | 0.00 | 0.00 | 0.00 | John&Mary Barnes/Mary IRA |
| Edit | ☐ | 0/0/00 | Buy | AAAX | 10 | 0.00 | 0.00 | 0.00 | John&Mary Barnes/Mary IRA |
| Edit | ☐ | 0/0/00 | Buy | AAAX | 10 | 0.00 | 0.00 | 0.00 | John&Mary Barnes/Mary IRA |
| Edit | ☐ | 0/0/00 | Buy | AAAX | 10 | 0.00 | 0.00 | 0.00 | John&Mary Barnes/Mary IRA |
| Edit | ☐ | 0/0/00 | Buy | AAAX | 10 | 0.00 | 0.00 | 0.00 | John&Mary Barnes/Mary IRA |

Approve all

<<Now displaying 1-5 of 5>>

Next step  Finish later

<<Now displaying 1-5 of 5>>

Modify Transactions | Account name     1165 — [Intuit, Inc. (INTU) ▼]     1150 — Changes to be saved: 0

| Date | Type | Shares | Price/Share | Amount | Share Balance |
|---|---|---|---|---|---|
| 1/1/2004 | Buy shares | 50 | $8.00 | -$400.00 | 50 |
| 11/15/2004 | Insufficient shares adjustment | +30 | | | 80 |
| 11/15/2004 | Sell shares | 80 | $15.00 | $375.00 | 0 |
| 12/1/2004 | Buy shares | 50 | $10.00 | -$500.00 | 50 |
| 1/1/2005 | Starting point | +100 | | | 150 |
| 1/1/2005 | Reinvested Dividend | 1 | | $0.00 | 151 |
| 3/1/2005 | Reinvested Dividend | 2 | | $0.00 | 153 |
| 3/15/2005 | Unknown | 15 | $12.34 | | |
| 4/1/2005 | NOTE: Balance adjusted to match FI balance of 168.001 on 4/1 | | | | |
| 4/15/2005 | Sell shares | 30 | $9.00 | $270.00 | 123 |
| 5/1/2005 | Share balance adjustment | +15.001 | | | 138.001 |

1170    1174  1172    1176

Modify Transactions

There are issues with your transactions data that you may want to address.

- Downloaded transactions have errors to be corrected. Learn more
- We adjusted the share balance of INTU to match your financial institution. Learn more
- If desired, you may enter the full history of your positions. Learn more.

1160

1180
Insufficient shares adjustment
There are not enough shares in this account to accommodate a sell or other share reducing transaction. Learn more
Date: 11/15/2004   Required shares: 80   Available shares: 50   Share adjustment: +30

[Add Transaction]

1190 — [Save all changes]     1192 — [Discard all changes]

FIG. 11b

Modify Transactions | Account name    Intuit, Inc. (INTU) — 1265    Changes to be saved: 0 — 1250

| Date | Type | Shares | Price/Share | Amount | Share Balance |
|---|---|---|---|---|---|
| 1/1/2004 | Buy shares | 50 | $8.00 | -$400.00 | 50 |
| 11/15/2004 | Insufficient shares adjustment | +30 | | | 80 |
| 11/15/2004 | Sell shares | 80 | $15.00 | $375.00 | 0 |
| 12/1/2004 | Buy shares | 50 | $10.00 | -$500.00 | 50 |
| 1/1/2005 | Starting point | +100 | | | 150 |
| 1/15/2005 | Reinvested Dividend | 1 | | $0.00 | 151 |
| 3/1/2005 | Reinvested Dividend | 2 | | $0.00 | 153 |
| 3/15/2005 | Unknown | 15 | $12.34 | | |
| 4/1/2005 | NOTE: Balance adjusted to match FI balance of 168.001 on 4/1 | | | | |
| 4/15/2005 | Sell shares | 30 | $9.00 | $270.00 | 123 |
| 5/1/2005 | Share balance adjustment | +15.001 | | | 138.001 |

1272, 1274, 1270

Modify Transactions

There are issues with your transactions data you may want to address.

- Downloaded transactions have errors to be corrected. Learn more
- We adjusted the share balance of INTU to match your financial institution. Learn more
- If desired, you may enter the full history of your positions. Learn more

1260

Share balance adjustment — 1280

Your share balance does not match the reported balance downloaded from your financial institution. We have adjusted your share balance until you are able to correct the discrepancy.

Date: 5/1/2005    Your balance: 123    Share adjustment: +15.001
Downloaded balance: 138.001      Show in counter>>

[Add Transaction]

Learn more

Some title
Date: 5/1/2005
Your balance: 80
Downloaded balance: 50
Share adjustment: +15.001

[Save all changes] — 1290    [Discard all changes] — 1292

Modify Transactions | Account name — 1450

Changes to be saved: 0

Intuit, Inc. (INTU) — 1465

Fixing download errors:
Source code not found

Call tech support 1-800-4GO-HELP — 1460

| Date | Type | Shares | Price/Share | Amount | Share Balance |
|---|---|---|---|---|---|
| 1/1/2004 | Buy shares | 50 | $8.00 | -$400.00 | 50 |
| 1/15/2004 | Significant shares adjustment | +30 | | | 80 |
| 11/15/2004 | Sell shares | 80 | $15.00 | $375.00 | 0 |
| 12/1/2004 | Buy shares | 50 | $10.00 | -$500.00 | 50 |
| 1/1/2005 | Opening share balance, adjusted to 150 shares | | | | 150 |
| 1/15/2005 | Reinvested Dividend | 1 | | $0.00 | 151 |
| 3/1/2005 | Reinvested Dividend | 2 | | $0.00 | 153 |
| 3/15/2005 | Unknown | 15 | $12.34 | | |
| 4/1/2005 | NOTE: Balance adjusted to match FI balance of 168.001 on 4/1 | | | | |
| 4/15/2005 | Sell shares | 30 | $9.00 | $270.00 | 123 |
| 5/1/2005 | Share balance adjusted | +15.001 | | | 138.001 |

1470 — 1472 — 1474 — 1476

Transaction Source code not found — 1480

This transaction is an error by your financial institution in their downloaded date. Please contact tech support for assistance. Email error to tech support. Learn more Trade Date: 3/15/2005   Shares: 15       Fees: $0.00
Settlement Date: 3/15/2005   Price/Share: $12.34   Net cost $175.10
Entered/Downloaded: 4/1/2005   Gross cost: $175.10

Notes: Mandatory distribution of IRA

[Modify Transaction] — 1482   [Delete Transaction] — 1484   [Add Transaction] — 1492

[Save all changes] — 1490   [Discard all changes]

| Status | Uploaded | Traded | Client/Account | Security | Action | Shares | Price | Fees | Cost |
|---|---|---|---|---|---|---|---|---|---|
| O | | 5/29/2012 | John and Mary Barnes/401k | FUSSX | Reinvested Dividend | 2 | $22.00 | $0.00 | $45.00 |
| O | | 5/29/2012 | John and Mary Barnes/House Fund | AEPGX | Reinvested Dividend | 2 | $22.00 | $0.00 | $45.00 |
| O | | 4/29/2012 | John and Mary Barnes/401k | FUSSX | Reinvested Dividend | 2 | $22.00 | $0.00 | $45.00 |
| O | | 4/29/2012 | John and Mary Barnes/Timmy's College Account | DGFX | Reinvested Dividend | 3 | $22.00 | $0.00 | $67.00 |
| O | | 4/29/2012 | John and Mary Barnes/401k | OVEBX | Reinvested Dividend | 3 | $22.00 | $0.00 | $67.00 |
| O | | 4/29/2012 | John and Mary Barnes/House Fund | AEPGX | Reinvested Dividend | 2 | $22.00 | $0.00 | $45.00 |
| O | | 3/29/2012 | John and Mary Barnes/Timmy's College Account | WM | Buy | 24 | $22.00 | $20.00 | $536.00 |
| O | | 3/29/2012 | John and Mary Barnes/401k | FUSSX | Reinvested Dividend | 2 | $22.00 | $0.00 | $45.00 |
| O | | 3/29/2012 | John and Mary Barnes/Timmy's College Account | DGFX | Reinvested Dividend | 3 | $22.00 | $0.00 | $67.00 |
| O | | 3/29/2012 | John and Mary Barnes/401k | OVEBX | Reinvested Dividend | 3 | $22.00 | $0.00 | $67.00 |
| O | | 3/29/2012 | John and Mary Barnes/House Fund | AEPGX | Reinvested Dividend | 2 | $22.00 | $0.00 | $45.00 |
| O | | 2/29/2012 | John and Mary Barnes/Timmy's College Account | WM | Buy | 36 | $22.00 | $20.00 | $824.00 |
| O | | 2/29/2012 | John and Mary Barnes/401k | SJM | Sell | 30 | $22.00 | $10.00 | ($660.00) |

INTELLIGENT RECONCILIATION OF DATABASE TRANSFER ERRORS

CROSS REFERENCE TO RELATED APPLICATIONS

This application is related to U.S. patent application Ser. No. 10/756,736, filed on Jan. 12, 2004, entitled "Method and System for Backfilling Transactions in an Account," the content of which is hereby incorporated by reference in its entirety.

FIELD OF THE INVENTION

The present invention generally relates to the field of database management.

BACKGROUND

Financial advisors provide advice to clients regarding a large variety of financial transactions. Such transactions, e.g., stock, bond, or mutual fund purchases or sales, are often placed with financial institutions, either by the financial advisor on behalf of clients, or directly by the clients. Financial advisors typically use an account management application (either operating locally or hosted on a network) to analyze the holdings of their clients. To obtain the clients' transactional data, a financial advisor will periodically download client account data from individual databases of the various financial institutions at which their clients have accounts. This data is stored in a separate database used by the advisor's account management application. During the downloading process, problems with the data almost always arise, especially with regard to conflicts between or among various data elements in the source and destination databases.

For example, data may have been improperly coded by the financial institution, e.g., an incorrect client number or stock symbol. Other data supplied by the financial institution such as account balances may not match existing data in the advisor's database. Data may be supplied that cannot be interpreted. Finally, problems may arise when loading data that is dependent on other data that has been rejected by the advisor's database.

Conventional solutions can detect and report some simple syntactic and semantic errors, such as missing data fields, incorrect data types, account not found, and transaction type not found. However, conventional solutions are incapable of intelligently correcting or otherwise providing assistance to the advisor to resolve such errors. The financial advisor or other user is assumed to know how to manually repair the errors, and is expected iteratively and interactively reload the affected data files. This is necessarily time-consuming, and may require the advisor to acquire specialized skills of data correction, that lie outside the advisor's core competence of financial analysis. Some systems provide an online help mechanism that includes screens that explain how to use a particular feature of the application, but do not provide any software mechanism within the context of such help information to effect the desired changes to the data.

SUMMARY

A software based method and mechanism identify categories of problems that commonly arise when transferring transactional data, and provide a set of interactive tools, called "assistants," for performing problem reconciling operations. A financial management application provides the capability to import transactional data from various financial institutions. One screen of the application lists an ordered sequence of problem categories according to discrepancies that can arise in the imported data. This screen provides access to a corresponding sequence of assistants, each of which is specifically adapted to assist the user in reconciling the particular discrepancies. The problem categories include account related problems, securities related problems, transaction related problems, and position related problems. Each assistant is displayed on a separate screen that includes a list of sub-problems and corresponding links to individual screens, each of which provides guidance information that explains how to resolve the problem, and an interactive software interface to enter corrective information. The user is able to systematically correct each type of problem in turn, and is provided with both explanatory information as to how to correct the problem and an in-place software interface for correcting the error. The software interface allows the user to supply the necessary data, without having to navigate to a separate part of the financial management application.

For example, an account assistant provides guidance for reconciling discrepancies associated with missing or unrecognized account numbers, along with a software interface that enables the financial advisor to directly select an existing account number, or set up a new account, without having to navigate to another part of the financial management application designed for new account setup. Similarly, a securities assistant provides guidance for reconciling discrepancies associated with unidentified securities, along with a software interface that enables the advisor to provide identifiers and descriptive information for such securities. After completing a reconciling operation with a particular assistant, the user is taken back to the main screen, which confirms success of the corrective action. The user can then proceed to the next problem and corresponding assistant. The application is organized so that the user corrects problems in an efficient order, thereby minimizing time and effort and eliminating rework.

The features and advantages described in the specification are not all inclusive and, in particular, many additional features will be apparent to one of ordinary skill in the art in view of the drawings, specification, and claims. In particular, the method and mechanism described are not limited to financial applications, but may be applied to a variety of other applications. Moreover, it should be noted that the language used in the specification has been principally selected for readability and instructional purposes, and has not been selected to delineate or circumscribe the inventive subject matter.

BRIEF DESCRIPTION OF THE DRAWINGS

FIG. 3b illustrates a client holdings list.

FIG. 4b illustrates an investment list organized by value.

FIG. 9 illustrates a user interface reviewing transaction data.

FIG. 10a illustrates a user interface for approving a transaction.

FIG. 10b illustrates a user interface for modifying a pending transaction or adding a transaction.

FIG. 11b illustrates a first user interface for reconciling insufficient shares.

FIG. 12b illustrates a second user interface for reconciling mismatched share balances.

FIG. 13b illustrates a second user interface for reconciling mismatched cash balances.

FIG. 14b illustrates a second user interface for reconciling downloading errors.

FIG. 15 illustrates a user interface for reviewing transactions.

DETAILED DESCRIPTION

Reference will now be made in detail to several embodiments of the present invention, examples of which are illustrated in the accompanying figures. The figures depict embodiments of the present invention for purposes of illustration only. One skilled in the art will readily recognize from the following description that alternative embodiments of the structures and methods illustrated herein may be employed without departing from the principles of the invention described herein.

System Architecture

Figure 1:
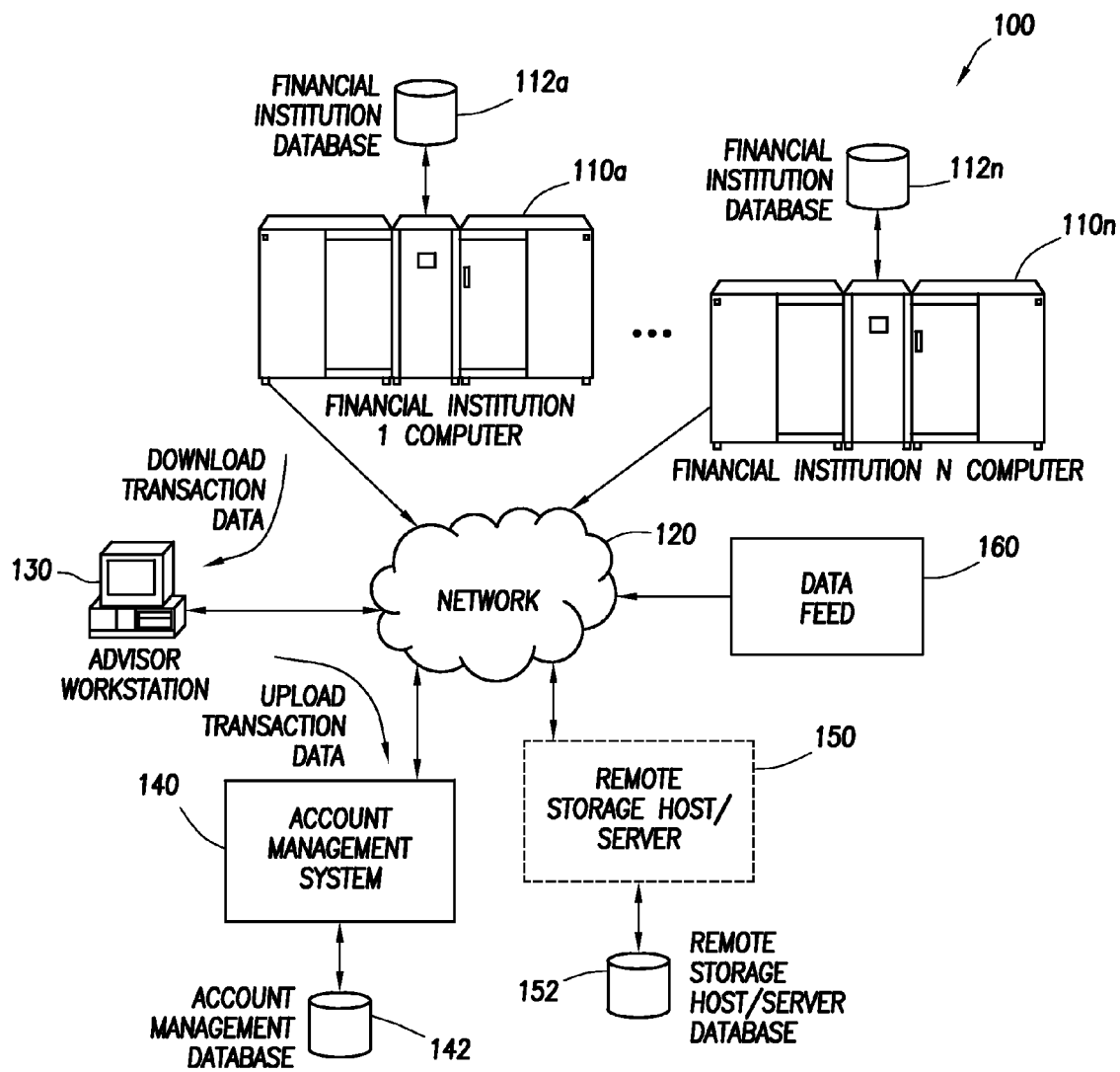
FIG. 1 is a system environment that supports one embodiment of the invention.

FIG. 1 is a schematic illustration of a system environment for one embodiment of the invention. Each of financial institution computers 110 is operated by a financial institution that holds account information for its clients. These financial institutions may be banks, brokerages, credit unions, saving and loan institutions, just to new a few. Financial institution computers 110 may be individual desktop computers, clusters of computers, mainframes, distributed networks of computers or computing resources, or other types of computing resources. Financial institution computers 110 each include or can access financial institution databases 112, which include information regarding owner accounts. Typical account information includes owner name, social security number, account numbers, positions, balances, and transactions, and any other pertinent information. Financial institution computers 110 are connected to a network 120 such as the Internet.

Also connected to network 120 is a workstation 130 operated by a financial advisor, hereafter "advisor." Advisor Workstation (workstation) 130 may be, e.g., any type of personal computer, workstation, network computer, or the like, using any operating system. The details of the particular type of workstation 130 are not material to the present invention. The advisor downloads his clients' transactional data from the financial institution computers 110 into workstation 130 via network 120. In addition, the advisor uploads data from workstation 130 to account management database 142 (database), which is hosted by an account management system 140. Optionally, a periodic download can be set up directly between certain financial institution databases 112 and account management system 140. The account management system 140 provides various financial analysis tools to the advisor for evaluating his clients' holdings, including tracking and analyzing their performance. Hosted applications, such as the account management system 140, are well known to those of skill in the art, and in particular, allow the advisor to access account management system 140 via advisor workstation 130. According to one embodiment, account management system 140 comprises software and hardware and is capable of receiving data downloaded from workstation 130 via network 120. According to an alternate embodiment, system 140 comprises software that runs on advisor workstation 130.

According to yet another embodiment, account management system 140 may direct data to a remote storage host/server database 152 via a remote storage host/server 150 operated and maintained by a third party. The location and operation of the account management database 142 and remote storage host/server database 152 are entirely transparent to the advisor. Therefore, hereafter references to account management database 142 will be understood to apply to remote storage host/server database 152 as well. Advisor workstation 130 and account management system 140 may access information from a data feed 160, which provides real-time or near-real-time information regarding, e.g., securities prices. Alternately, data feed 160 may supply nightly closing prices of securities.

Financial Account Management

Advisors periodically download their clients' transactional data from financial institution databases 112. Each financial institution provides its database schema, which defines the organization of information in the database, and according to which data is downloaded and parsed. Data is temporarily downloaded into local storage within workstation 130. Following local storage in workstation 130, the advisor uploads the data via account management system 140 into account management database 142. Conventionally, uploading is almost always initially unsuccessful in part, due both to problems in the imported data itself and/or conflicts between the imported data, and existing information in financial institution and account management databases 112 and 142, respectively. For example, data may have been improperly, inconsistently or incompatibly coded in financial institution databases 112 by the financial institutions, resulting in incorrect or unrecognized account numbers or stock symbols. Other data supplied by the financial institutions, such as account balances or positions, may exhibit discrepancies with respect to corresponding existing data in account management database 142. Data may be supplied that cannot be interpreted by account management system 140. Problems may arise when uploading data that is dependent on other data that has been rejected by account management database 142. Rounding effects may cause balances to not match, and incomplete setup by the advisor may cause data to be rejected, even though no inaccurate data has been entered. The account management system 140 provides a number of "reconciliation assistants" that enable the advisor to systematically correct each of these and other types of errors during the download process itself. The reconciliation assistants are further described below.

Figure 3A:
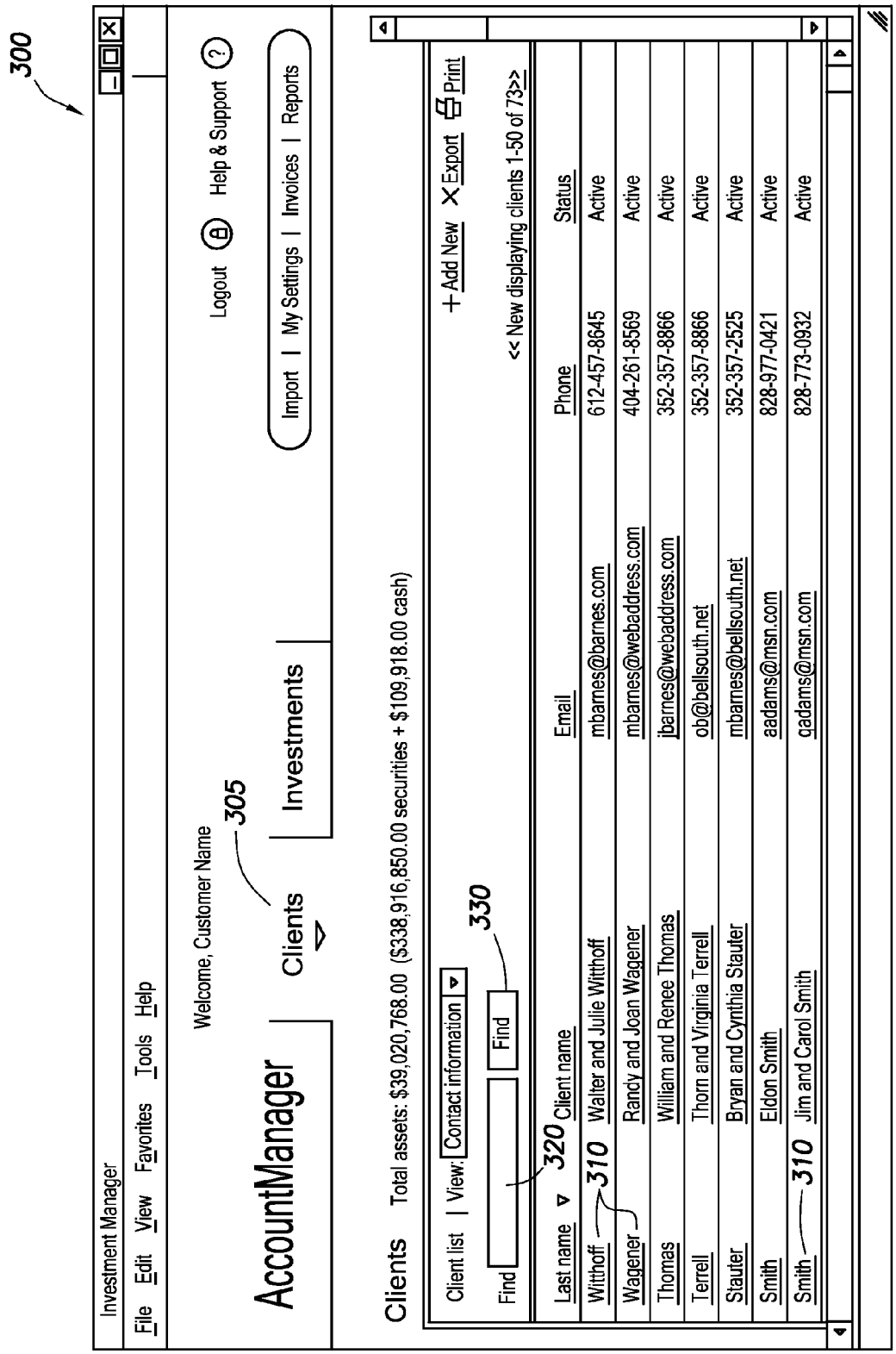
FIG. 3a illustrates a client contact information list.

The account management system 140 provides various interfaces to enable an advisor to review the accounts of any of his clients, at various levels of detail. For example, FIG. 3a shows a user interface screen presented to the advisor that contains client contact information 300 for each of the advisor's clients, including client name 310, email address, account status and the like. The user invokes this screen by clicking the Clients button 305. As shown, the information is ordered according to clients' last names 310. The information may be optionally forward- or reverse-ordered according to full client name, email address, phone number or active/inactive status, and is searchable via Find field 320 and Find button 330. FIG. 3b shows another example information screen 350 that shows individual clients' securities holdings. Screens 300 and 350 may be alternately invoked by clicking the appropriate view type (e.g., contact information, holdings value) in dropdown list 360.

Figure 4A:
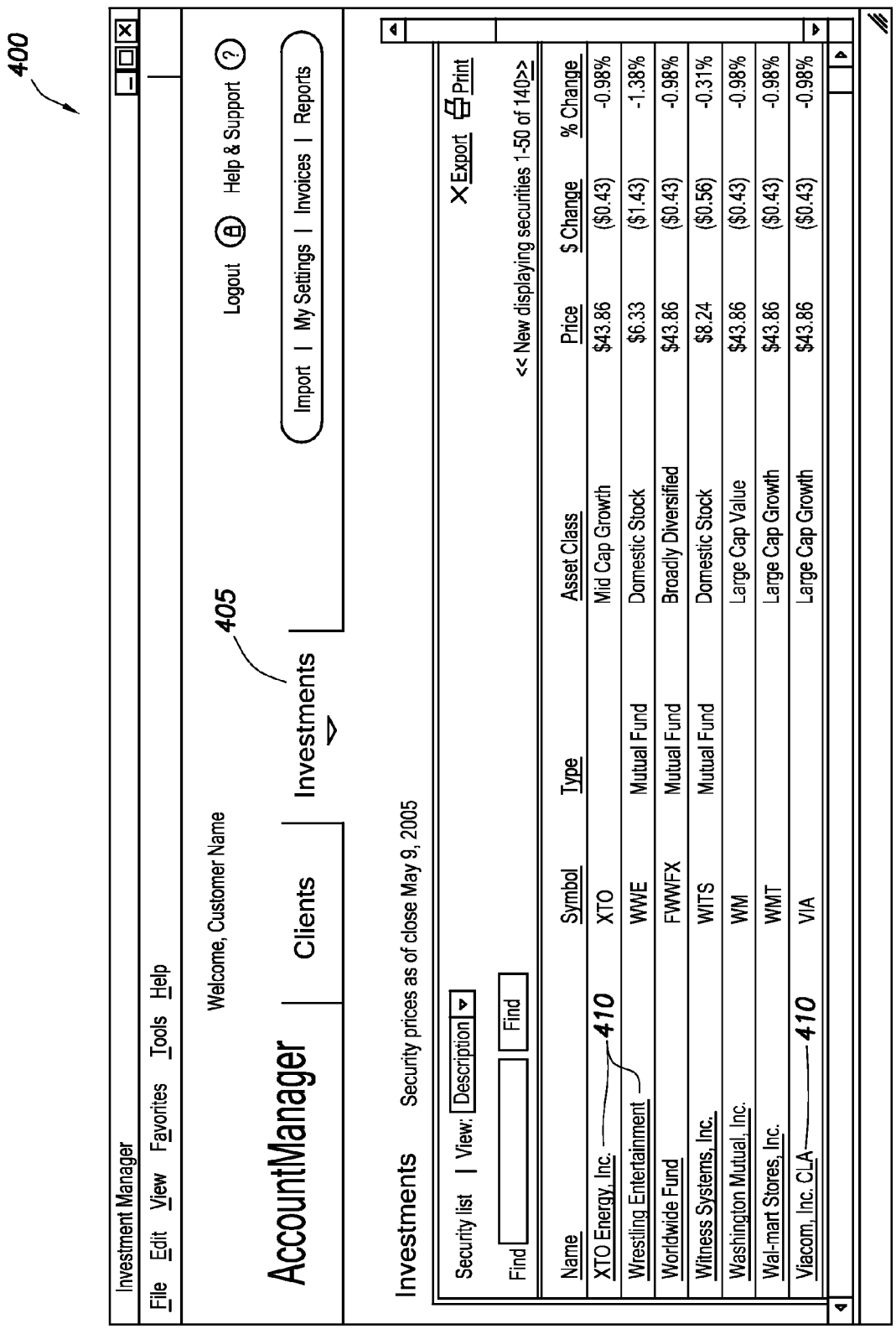
FIG. 4a illustrates an investment list organized by description.

FIG. 4a shows a screen 400 that is invoked by clicking the Investments tab 405. Screen 400 includes a list of securities owned by an advisor's clients 410 represented in account management database 142, along with descriptive information. This screen shows the corresponding fund names, symbols (tickers), types, asset classes, price (at time of last download), and the price change of each security versus the previous download (in dollars and percent).

FIG. 4b shows a screen 450 of additional securities value information, including the total number of shares of each security and corresponding total value for all clients in account management database 142. In general, popup text messages are available to guide the user, such as message 460, which displays when the cursor is positioned over the Price field. Message 460 indicates that the data can be sorted by price by clicking on the corresponding column heading.

Specific Embodiments for Intelligent Error Reconciliation

Figure 2:
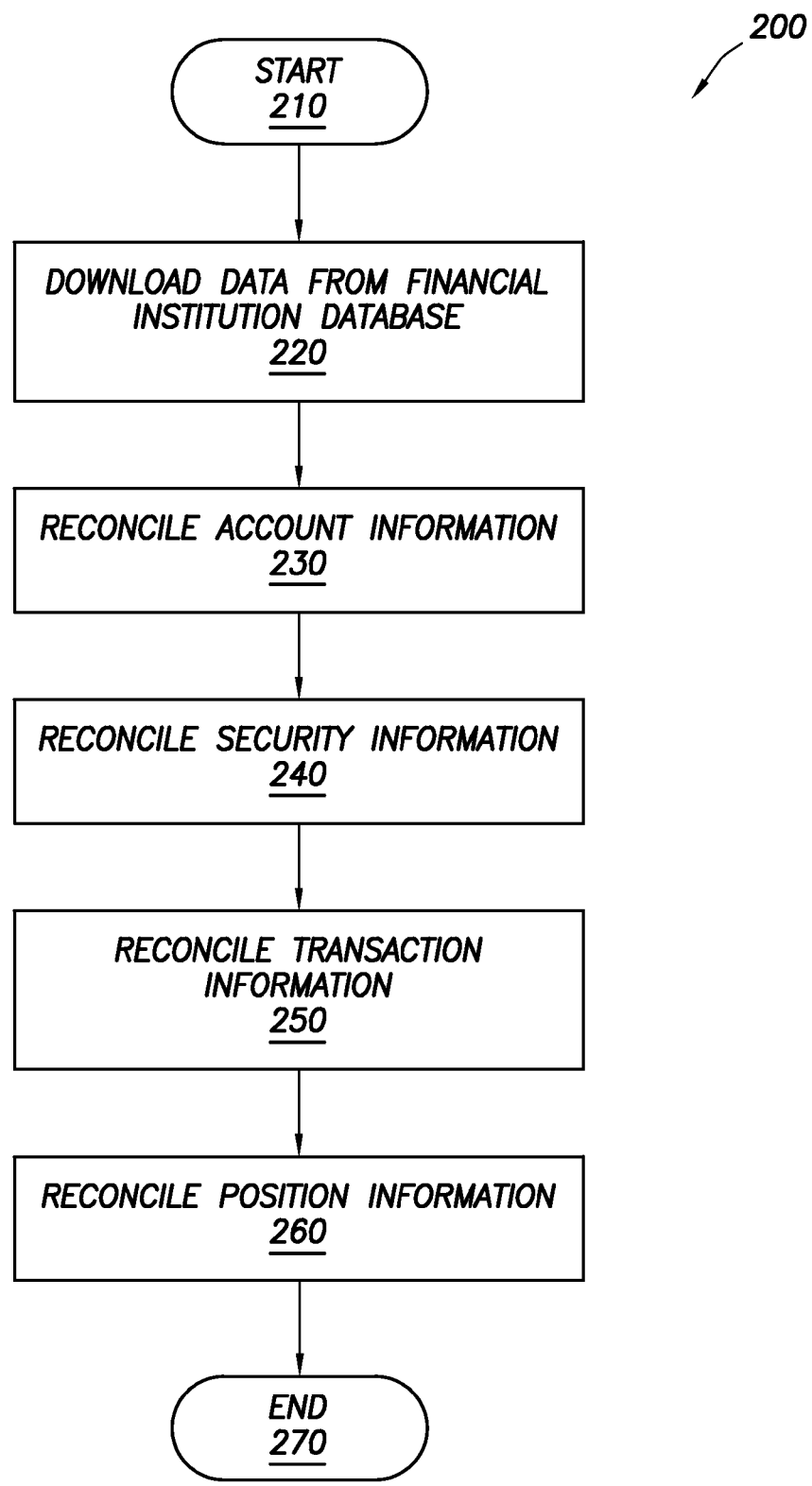
FIG. 2 illustrates one embodiment of a workflow method of the invention.

FIG. 2 shows a method for automated discrepancy reconciliation. The method comprises downloading data 220 from one of financial institution databases 112, and then applying an ordered sequence of reconciling operations in subsequent steps to be described below. Corresponding to this method is an integrated set of software tools, the above described assistants, provided by account management system 140 and accessible via workstation 130, using a browser or other application. At any point within method 200 (or otherwise), the advisor may view existing information in account management database 142.

Figure 5:
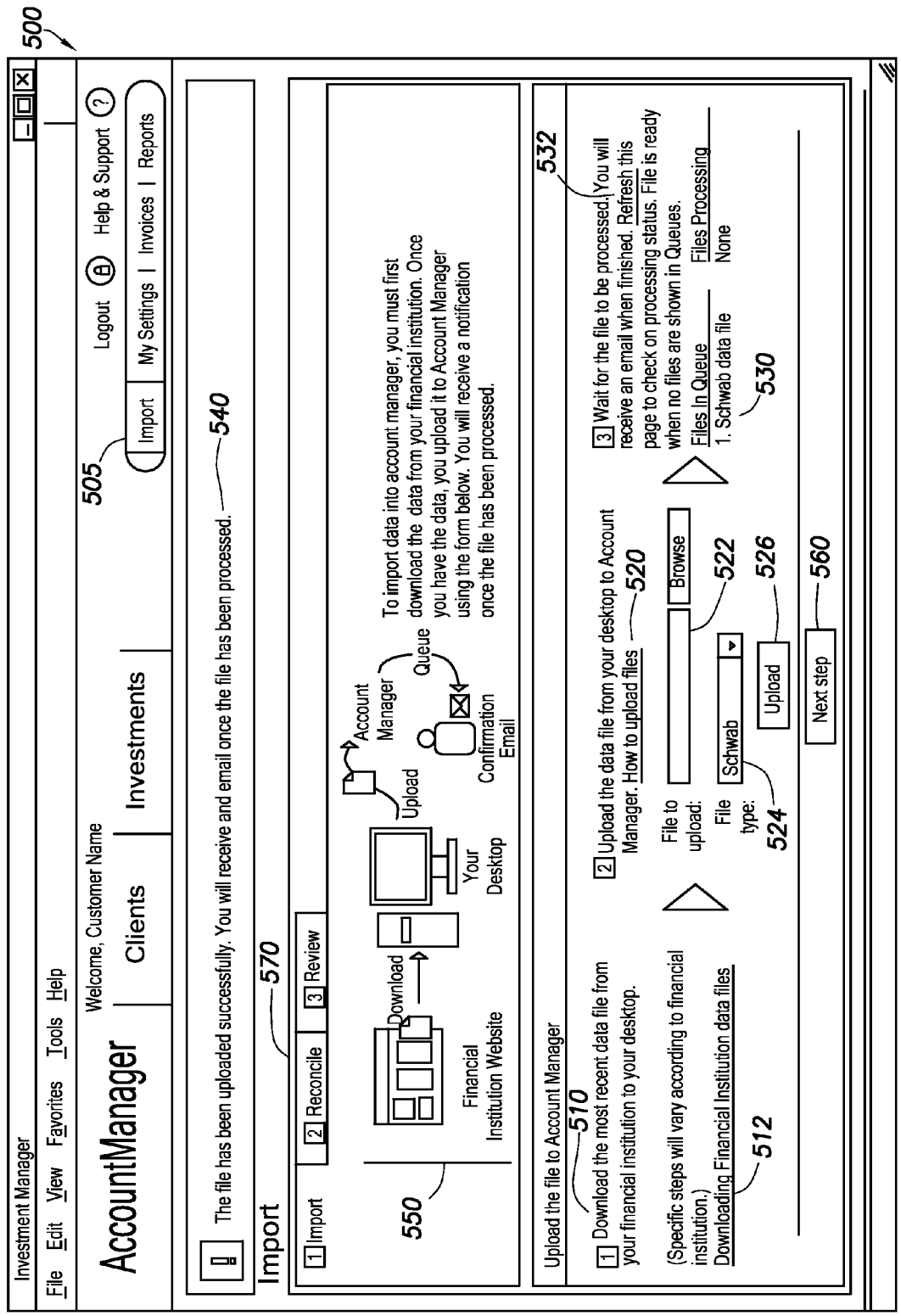
FIG. 5 illustrates a user interface for downloading data from a financial institution and uploading the data to a database.

When desired, the advisor downloads, i.e., imports data 220 from one of financial institution databases 112 to local storage in workstation 130. This is mechanized by clicking Import button 505 of interface 500, as shown in FIG. 5. The advisor is guided by information 510, and may be further guided by clicking link 512. The advisor is next prompted by message/help link 520 to upload the data from workstation 130 to management system 140. The advisor specifies the destination file name in field 522 and the file type in field 524. The file type implies the data base structure of the named institution, e.g., Schwab.

The advisor then clicks upload button 526, and the file to be uploaded is placed in a queue, as indicated by status message 530. The advisor optionally clicks the refresh button 532 to check the queue status. When the file has been successfully processed by account management system 140, queue status message 530 disappears. An email may be sent to the advisor confirming the upload. In addition, message 540 confirms successful uploading. During the downloading and uploading, the advisor is guided by graphic and associated text 550, which show a schematic diagram and description of the pertinent processes.

Figure 6:
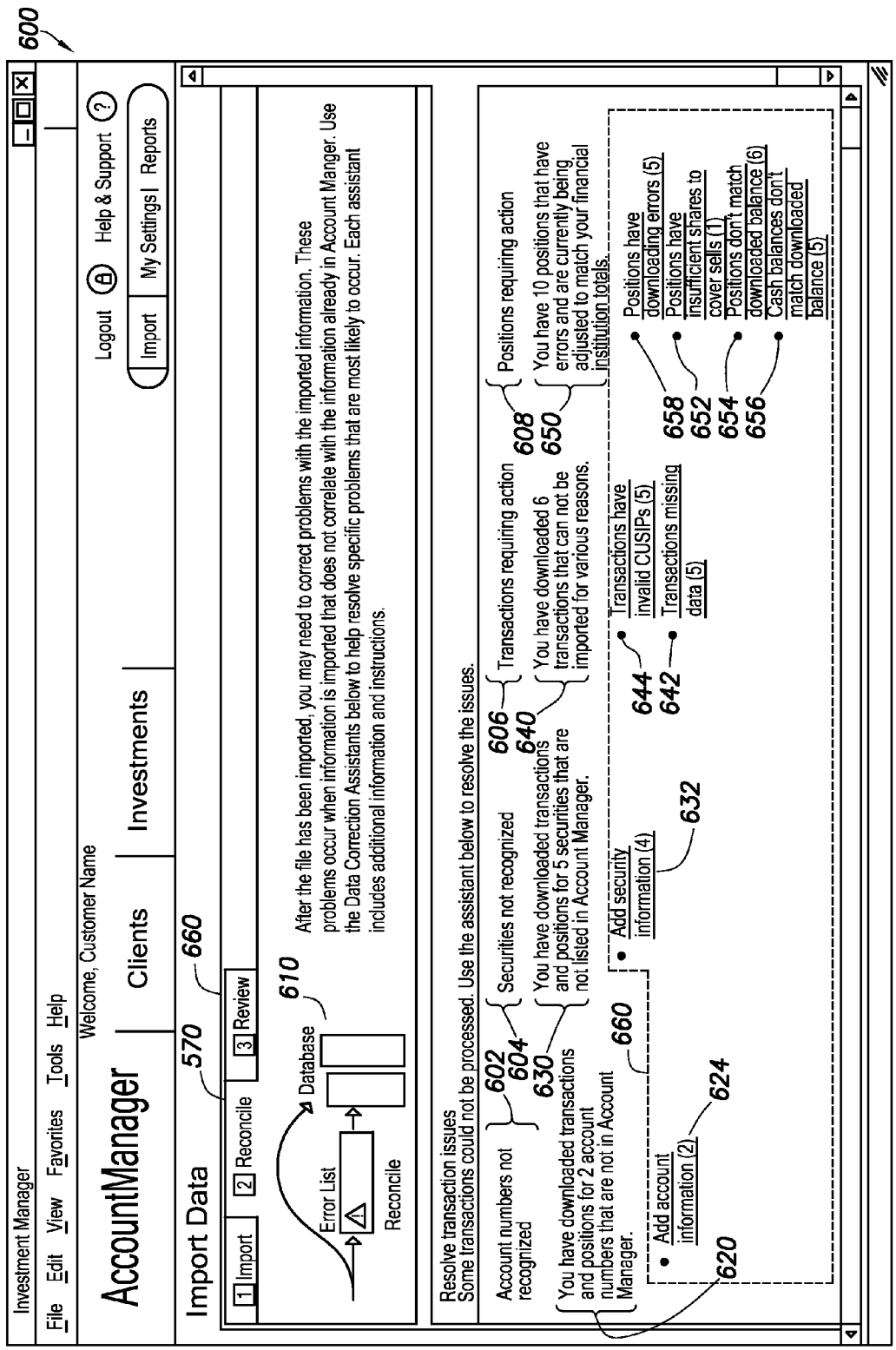
FIG. 6 illustrates a user interface for invoking reconciliation assistants.

Following successful uploading, the advisor may click the Next step button 560, or may equivalently click Reconcile tab 570. This invokes reconciliation screen 600, shown in FIG. 6. This is the user interface from which the advisor launches any of a number of reconciliation "assistants," i.e., user interfaces directed to resolving particular types of discrepancies. A guidance area 610 informs the advisor that the purpose of the screen is to enable correction of errors or discrepancies in the uploaded data. As illustrated in FIG. 6, the user interface screen 600 provides an ordered sequence of different types of problems that have been (or may be) encountered in the imported data. This ordered sequence includes account related problems 602, securities related problems 604, transaction related problems 606, and position related problems 608. Within each problem category are one or more links 660 to specific types of subproblems.

Figure 7A:
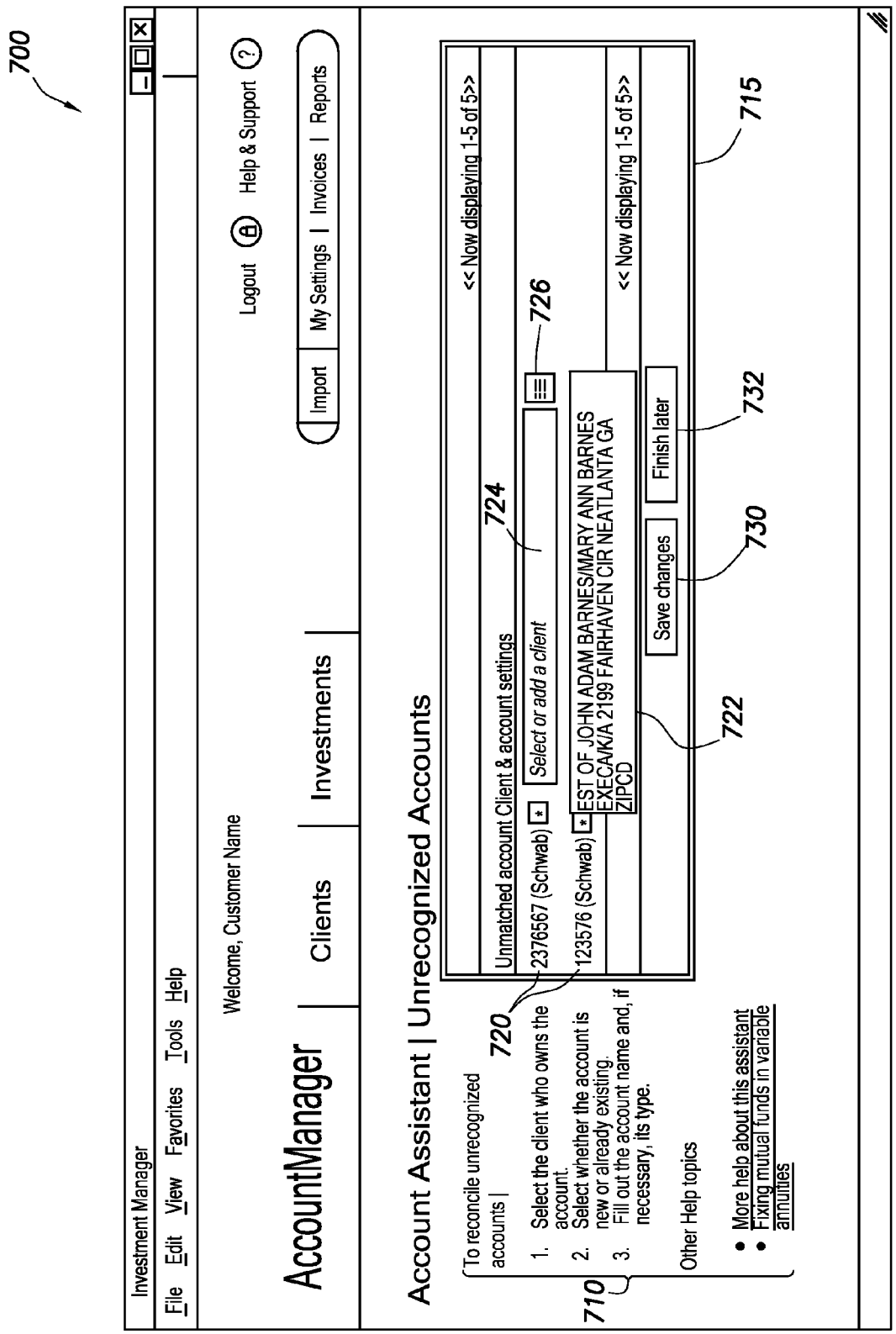
FIG. 7a illustrates a user interface for reconciling unrecognized accounts.

Returning to FIG. 2, the advisor is now prepared to Reconcile Account Information 230, i.e., to correct (if necessary) the first category of problems. The advisor is apprised of the necessity to do so by message 620, and if appropriate, clicks the Add account information link 624. This takes the advisor to the Unrecognized Accounts Assistant screen 700, shown in FIG. 7a.

Figure 7B:
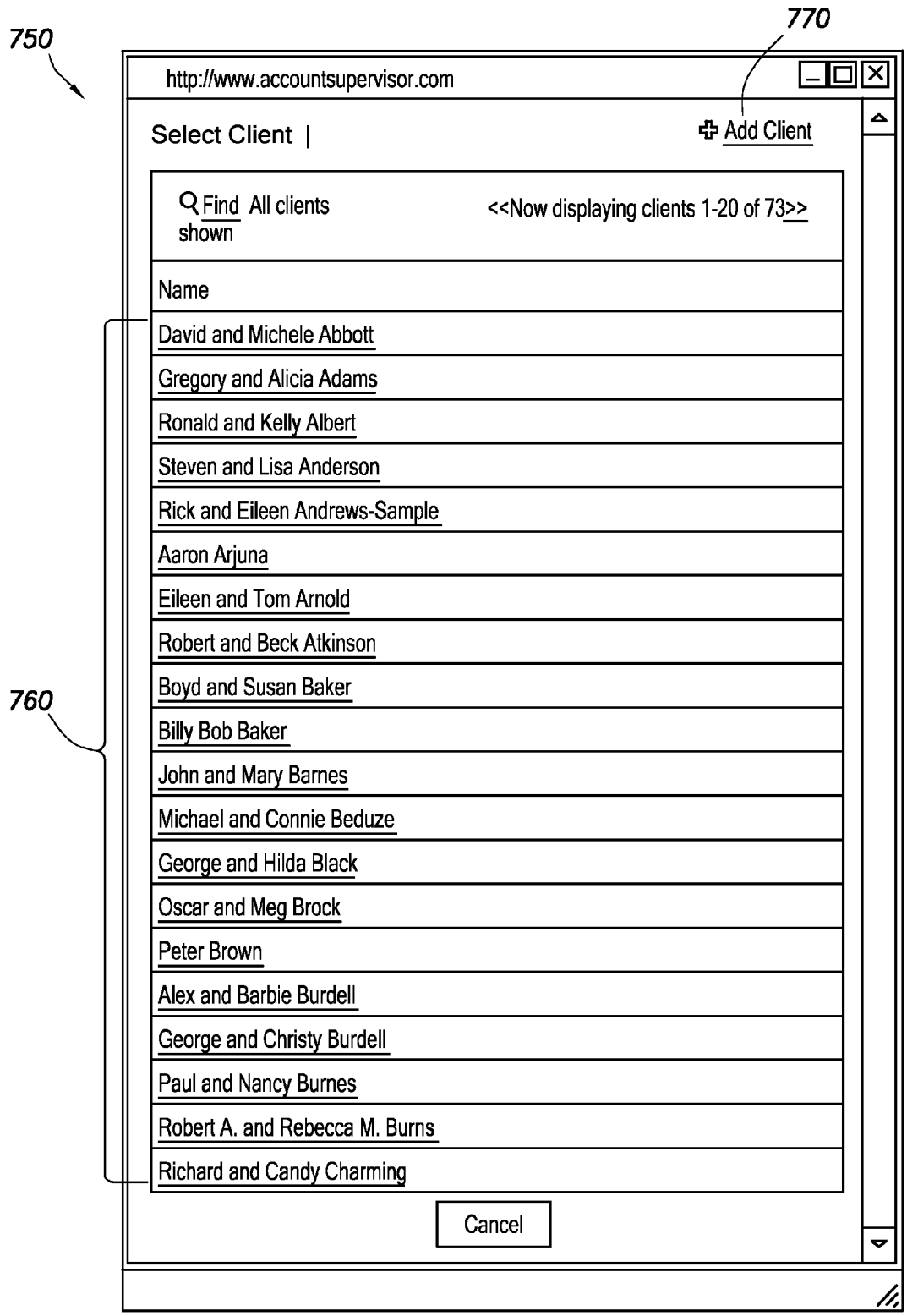
FIG. 7b illustrates a user interface for selecting an existing account.

The account assistant 700 comprises guidance 710 and user interface tool 715. The guidance 710 provides detailed and specific instructions to the advisor as to how to reconcile the unrecognized account numbers. The user interface tool 715 comprises various fields and data selection elements (e.g., drop down menus, pick lists, popup windows) that enable the advisor to directly correct the account related problems, including enabling the advisor to select an existing account to associated with the unrecognized account, or create a new account to associate with the unrecognized account. In user interface tool 715, there is displayed a line for each unrecognized account number 720, as well as the name of the financial institution from which the account data was received. An account number is unrecognized when it does not match an existing account number in account management database 142. Positioning the cursor over a listed account number causes a popup window, e.g., 722, to appear with additional information describing the account, if any such information is applicable, which information is extracted from the data import file itself. The descriptive information is useful to the advisor to determine which existing account, if any, the imported account is to be associated with, or if a new account needs to be created. The advisor may click button 726 to display a list of existing accounts 750, as shown in FIG. 7b. The advisor may associate one of the existing accounts with the account number by clicking the appropriate link 760. If a suitable existing account is not available in list 760, the advisor may click the Add Client link 770 to display a popup window that allows entry of new account information, including household name, client name, social security number and active/inactive status. Once all accounts have been matched, the advisor clicks the Save changes button 730 to save changes and return to screen 600. Alternately, the advisor may return to screen 600 without saving changes by clicking the Finish later button 732. Notice that the advisor is able to make these corrections to the account information without having to navigate to a different screen or user interface of the application, but rather can make the changes directly in the context of the assistant itself.

Figure 8A:
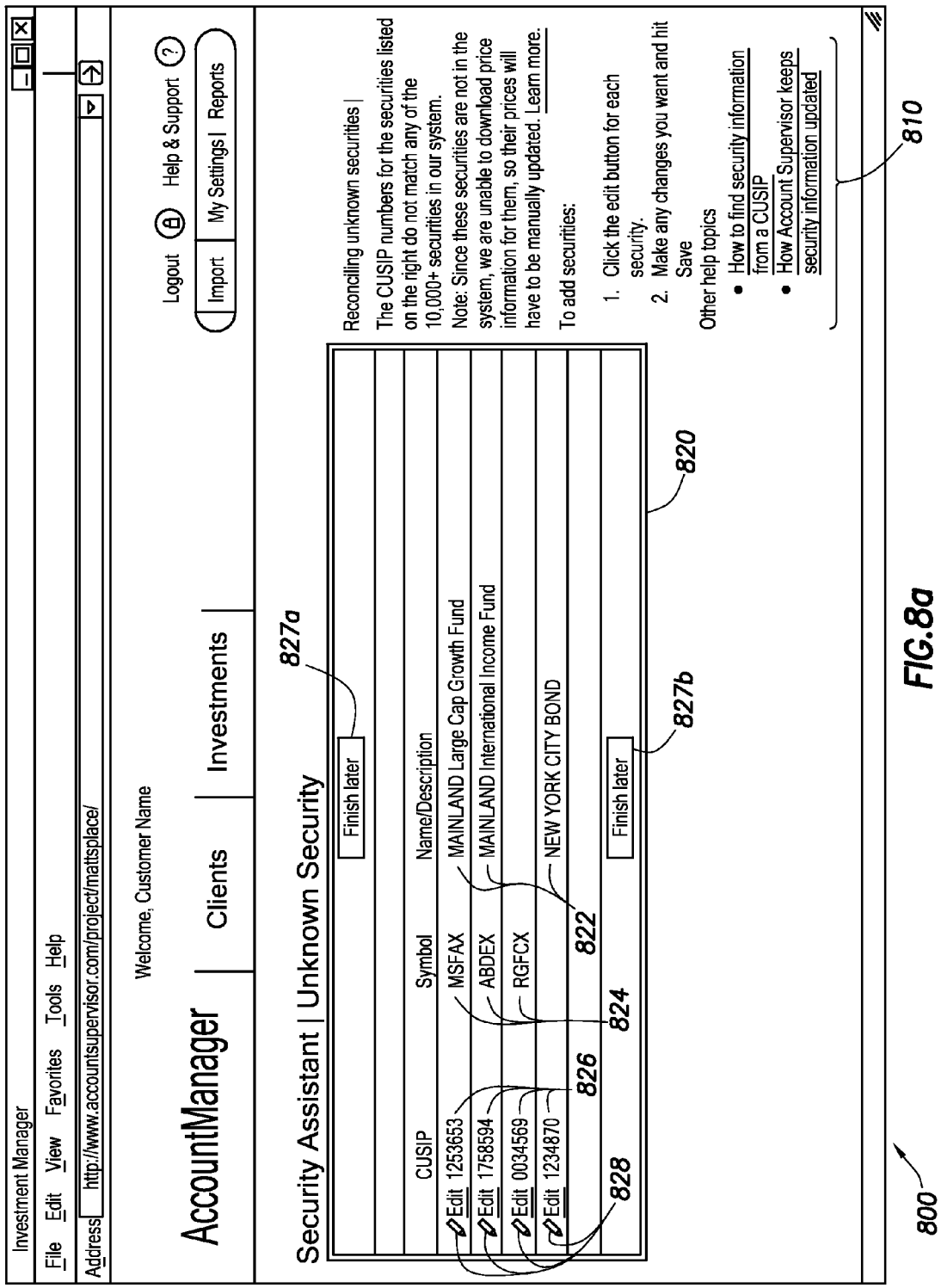
FIG. 8a illustrates a user interface for reviewing securities information.
Figure 8B:
FIG. 8b illustrates a user interface for editing securities information.

Referring again to FIG. 6, the advisor is presented with guidance 630 regarding the facility, if necessary, to reconcile security information 240 for a specified number of securities that do not match the information in data feed 160. In such a case, the advisor may define an appropriate security. For example, if security-related information in the download file does not match a corresponding security symbol or name, the advisor may click link 632, which invokes screen 800 of FIG. 8*a*. Area 810 provides guidance with specific instructions to the advisor as to how to reconcile the discrepancy. User interface tool 820 includes descriptive fields for security name/description 822, symbol 824, and CUSIP number 826. The advisor may click either Finish later button 827 to return to screen 600, or may add or change the information by clicking the appropriate Edit button 828. This invokes screen 850, shown in FIG. 8*b*. User interface tool 860 includes descriptive fields and corresponding text entry fields, drop-down lists and menu buttons as shown for entering or changing the security-related information. When finished, the advisor may either click on Create security 890 to effect the changes, or Cancel 892 to discard changes. In either case, the user is returned to screen 800 of FIG. 8. From screen 800, the user may navigate back to screen 600 by clicking either Finish later button 827.

Figure 9:
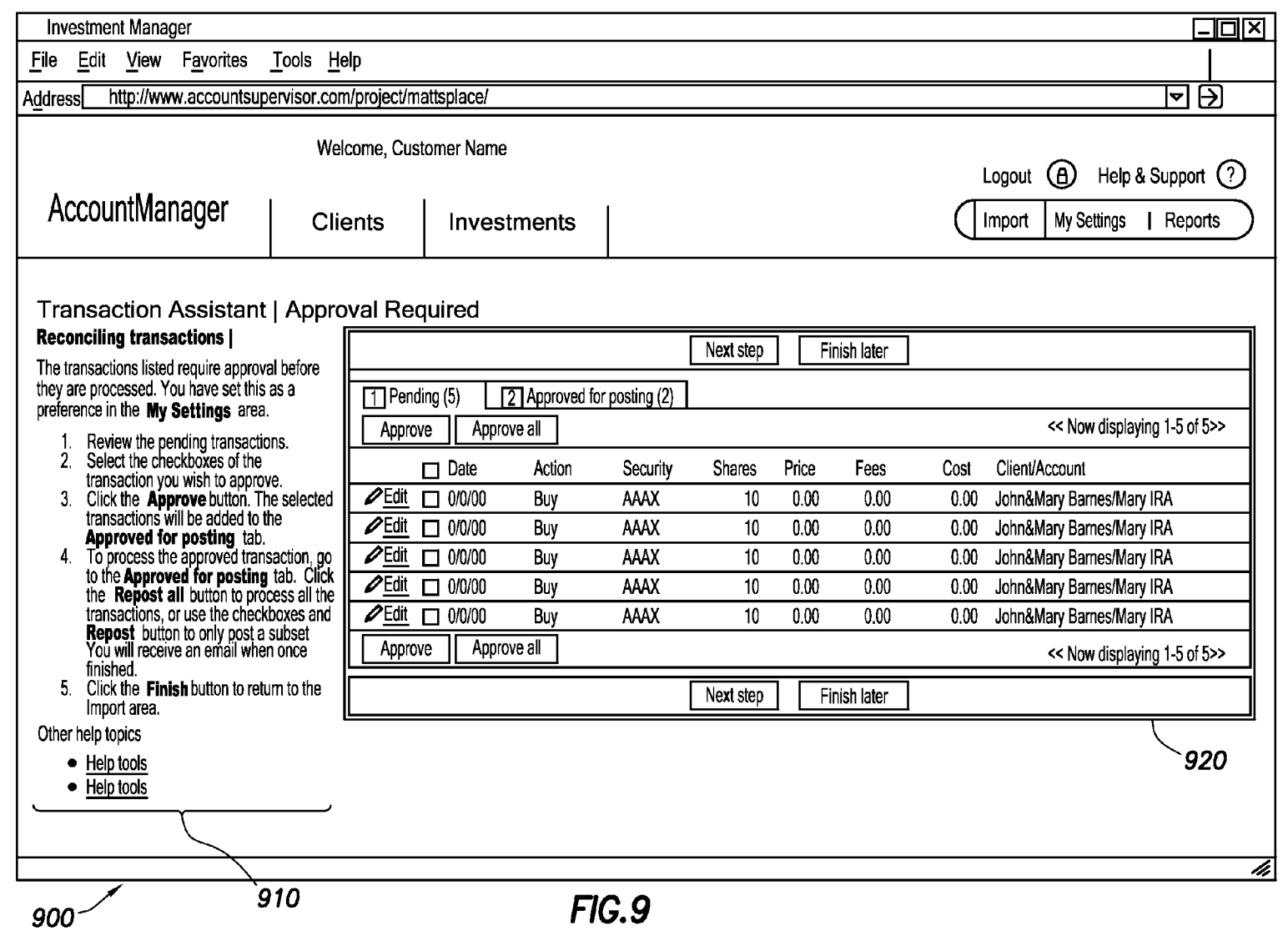

Returning to FIG. 6, the advisor is next presented with guidance 640 regarding the facility, if necessary, to reconcile transaction information 250. For example, if a downloaded transaction is missing data, the advisor may click on link 642, which invokes screen 900 of FIG. 9. Area 910 provides guidance with specific instructions to the advisor as to how to reconcile the discrepancy. User interface tool 920 includes descriptive fields with information regarding the various securities, as illustrated for the examples shown.

Figure 10B:
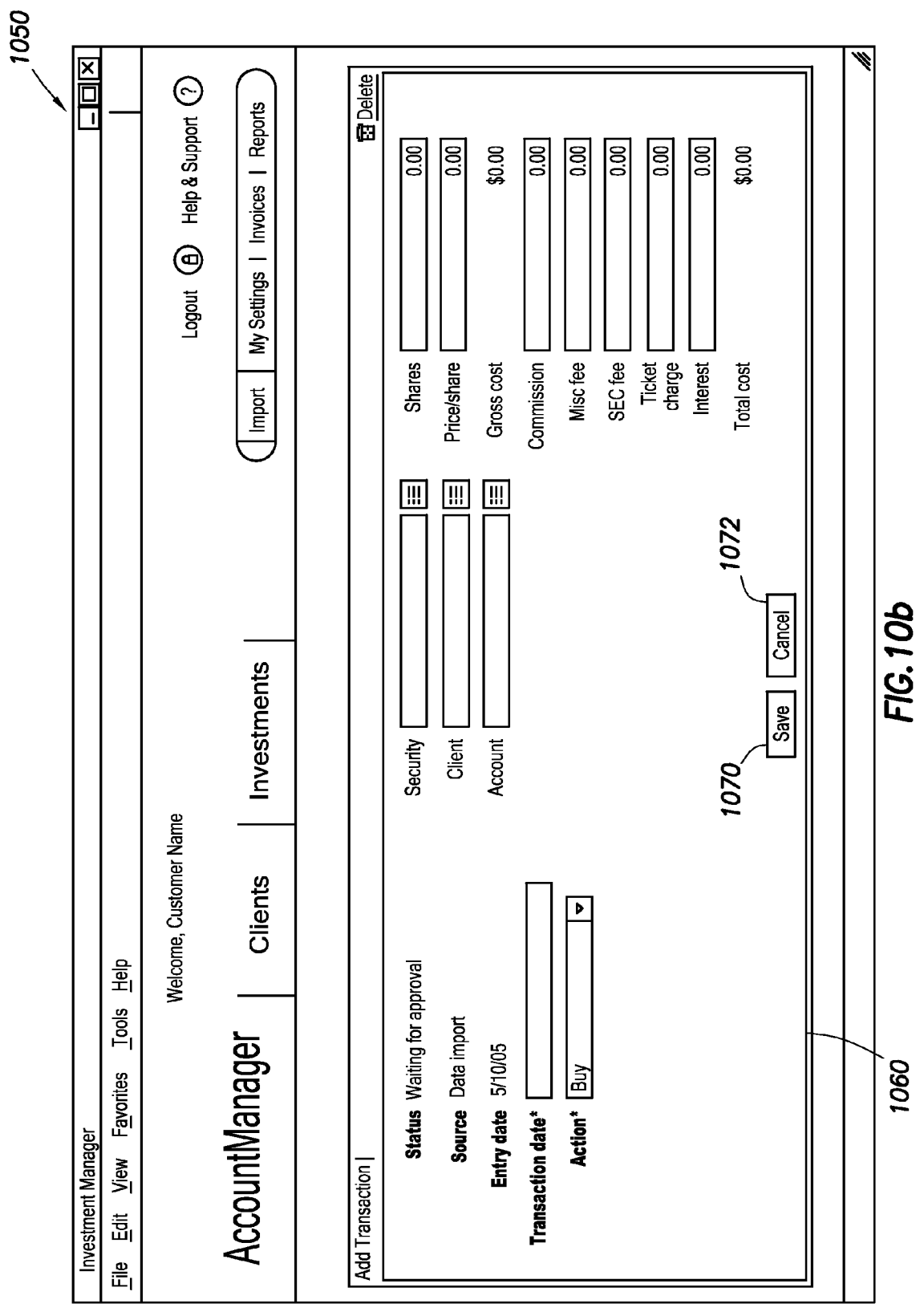

Some advisors may wish to review all transactions before they are uploaded to account management database 142. In this case, the Advisor may require downloaded transactions to be approved before uploading. As shown in FIG. 10*a*, the advisor may approve transactions by selecting any of checkboxes 1022 corresponding to the transactions to be approved. The advisor may then click either of the approve buttons 1024. The approved transactions are then transferred to the Approved for posting tab 1026. Alternately, clicking either of the Approve all buttons 1028 approves all listed transactions. The advisor then clicks either the Approved for posting tab 1026 or the Next step button 1030 to view the approved accounts. Optionally, either Finish later button 1032 may be clicked to save changes and return to screen 600.

Optionally, the advisor may edit a pending transaction listed within area 920 by clicking the appropriate Edit link 1029. Doing so invokes the Edit/Add transaction screen 1050 shown in FIG. 10*b*. The fields, dropdowns and pick list buttons shown in user interface tool 1060 may be used to edit or add transaction information as desired. Clicking the Save button 1070 saves the changes and returns the advisor to screen 1000 of FIG. 10*a*. Clicking the Cancel button 1072 returns the advisor to screen 1000 without saving changes.

Figure 10C:
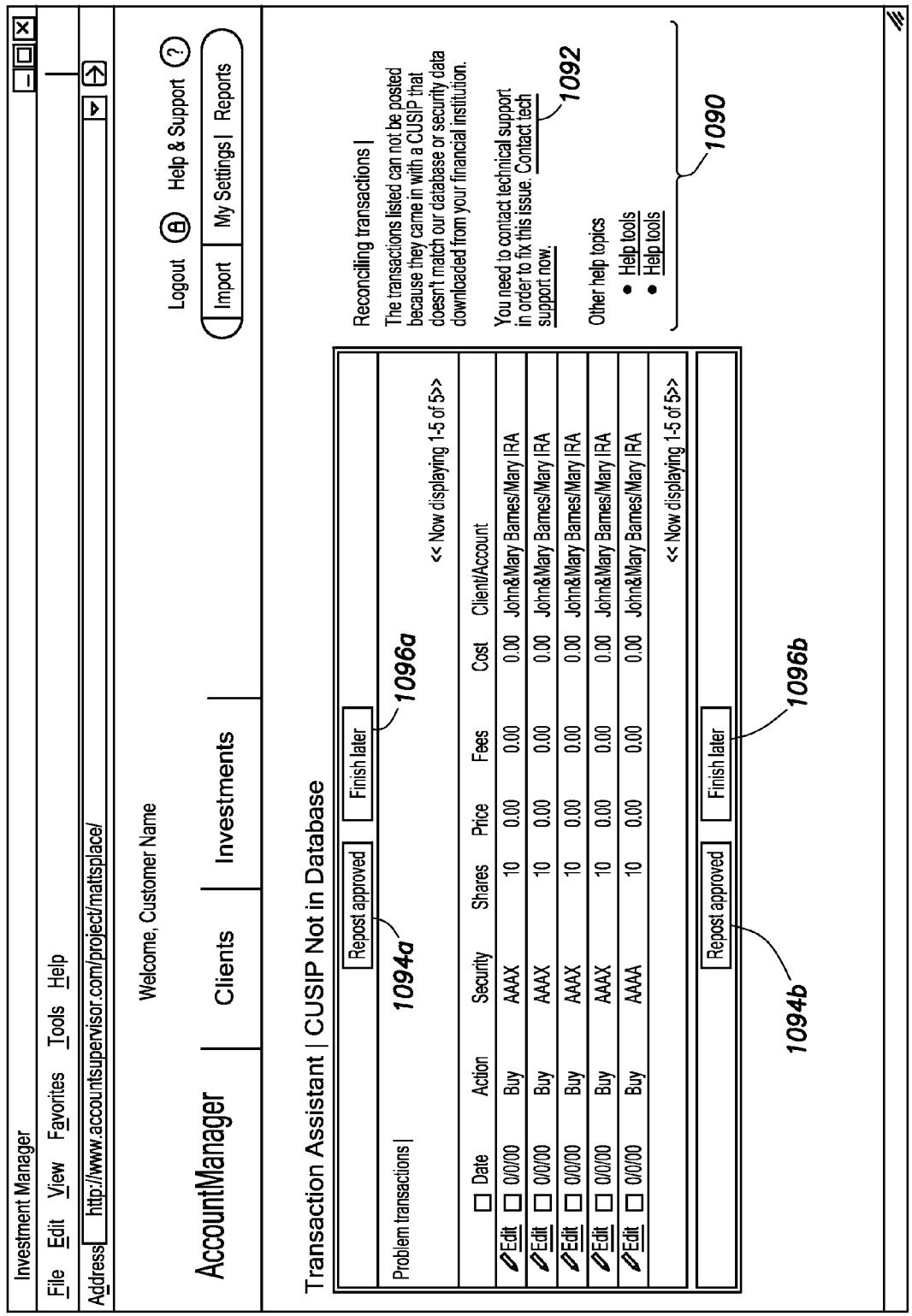
FIG. 10c illustrates a user interface for contacting a technical support representative.

Returning to FIG. 6, the user may be alerted to the existence of invalid CUSIP numbers in transactions according to link 644. Clicking link 644 invokes screen 1080, as shown in FIG. 10*c*. Area 1090 provides guidance with specific instructions to the advisor as to how to reconcile the discrepancy. Since the level of proficiency required to resolve this problem exceeds that of the typical user, the user is directed to contact a technical support facility by clicking link 1092 as shown. The user may request that all transactions listed be uploaded to account management database 142 by clicking either Repost approved button 1094. Transactions within screen 1080 that are valid and have been reconciled will be uploaded. Transactions that are not valid or that have not been fully reconciled will be saved in temporary storage pending reconciliation by the user, and will continue to appear in the assistants. To minimize server loading, transactions may not be uploaded immediately, and uploading may be performed in a manner that allows the user to conduct other operations concurrently. The user receives an email when all appropriate transactions have been uploaded. Clicking either Finish later button 1096 takes the user back to screen 600.

It will be appreciated that while specific examples of reconciling transaction information 250 have been described, other types of transaction-related issues may be reconciled using similar user interfaces with guidance tailored to the specific issues.

Figure 11A:
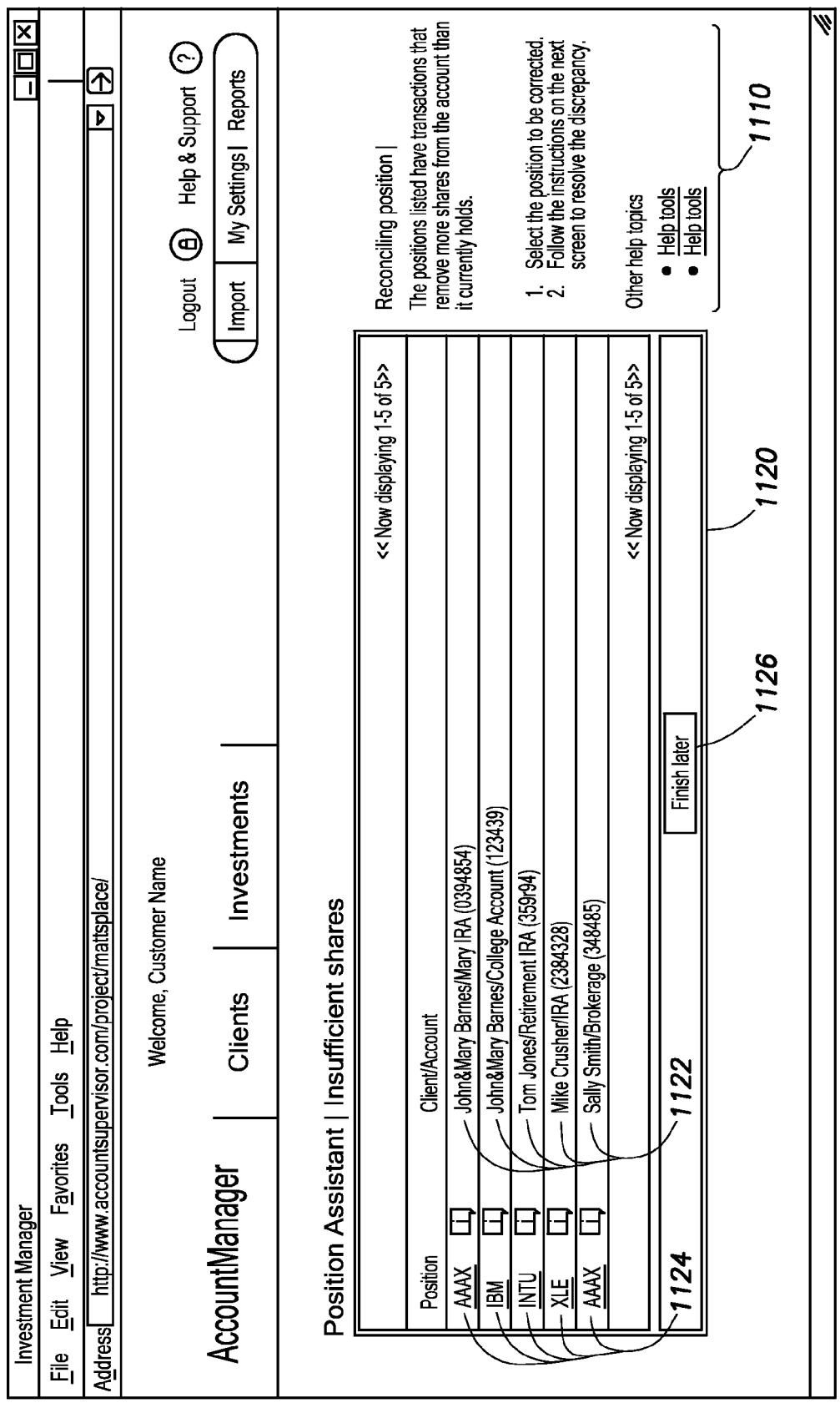
FIG. 11a illustrates a first user interface for reconciling insufficient shares.

Referring back to FIG. 6, the advisor is next presented with guidance 650 regarding the facility, if necessary, to reconcile mismatched security positions 260. For example, missing transactions or rounding errors associated with previously downloaded transactions can cause a position's share balance to be in error, which in turn may cause a sell transaction to fail due to insufficient shares. Account management system 140 detects such conditions by comparing the downloaded position data to the existing position data in account management database 142. Following the example above, the advisor may reconcile the mismatched share amounts by clicking link 652, which invokes screen 1100, as shown in FIG. 11*a*.

Area 1110 provides guidance with specific instructions to the advisor as to how to reconcile the discrepancy. User interface tool 1120 includes descriptive fields 1122. The user may exit screen 1100 without saving changes and return to screen 600 by clicking Finish later button 1126. Alternately, the user may click a link 1124 to reconcile the desired position, which invokes screen 1150 of FIG. 11(*b*). Area 1160 provides guidance with specific instructions to the advisor as to how to reconcile the selected position. Alternately, drop-down list 1165 allows the user to select a different position. Area 1170 shows a list of all transactions for the selected position, both posted and in error, sorted by date. Column 1172 shows a running share balance. Area 1170 may show a transaction for which information is missing, such as transaction 1174, for which transaction type and amount are unavailable. The discrepancy in the share balance is represented by Share balance adjustment transaction 1176, which the system creates on the date of a sale transaction. The user can select any transaction in the list and view the corresponding full information in area 1180, wherein the user may also edit, delete or add a transaction to correct the discrepancy. For example, FIG. 11*b* shows details regarding the selected Insufficient shares adjustment dated Sep. 15, 2004. In this manner, the user may also attempt to reconcile erroneous or rejected transactions. With each correction or change, the user will see the running share balance in column 1172 change accordingly. In addition, Share balance adjustment transaction 1176 will change accordingly to make the balance correct on that day. For example, if the starting discrepancy is 10 shares, the adjustment will be +10 shares. If the Advisor enters a buy transaction of 5 shares, the adjustment will change to +5 shares. Once Share balance adjustment transaction 1176 reflects zero adjustment, the position has been reconciled. If desired, the amount of Share balance adjustment transaction 1176 can be left nonzero until a later time when additional reconciliation information is available. The user may save changes by clicking Save all changes button 1190. Alternately, the advisor may return to screen 600 without saving changes by clicking the Discard all changes button 1192.

Figure 12A:
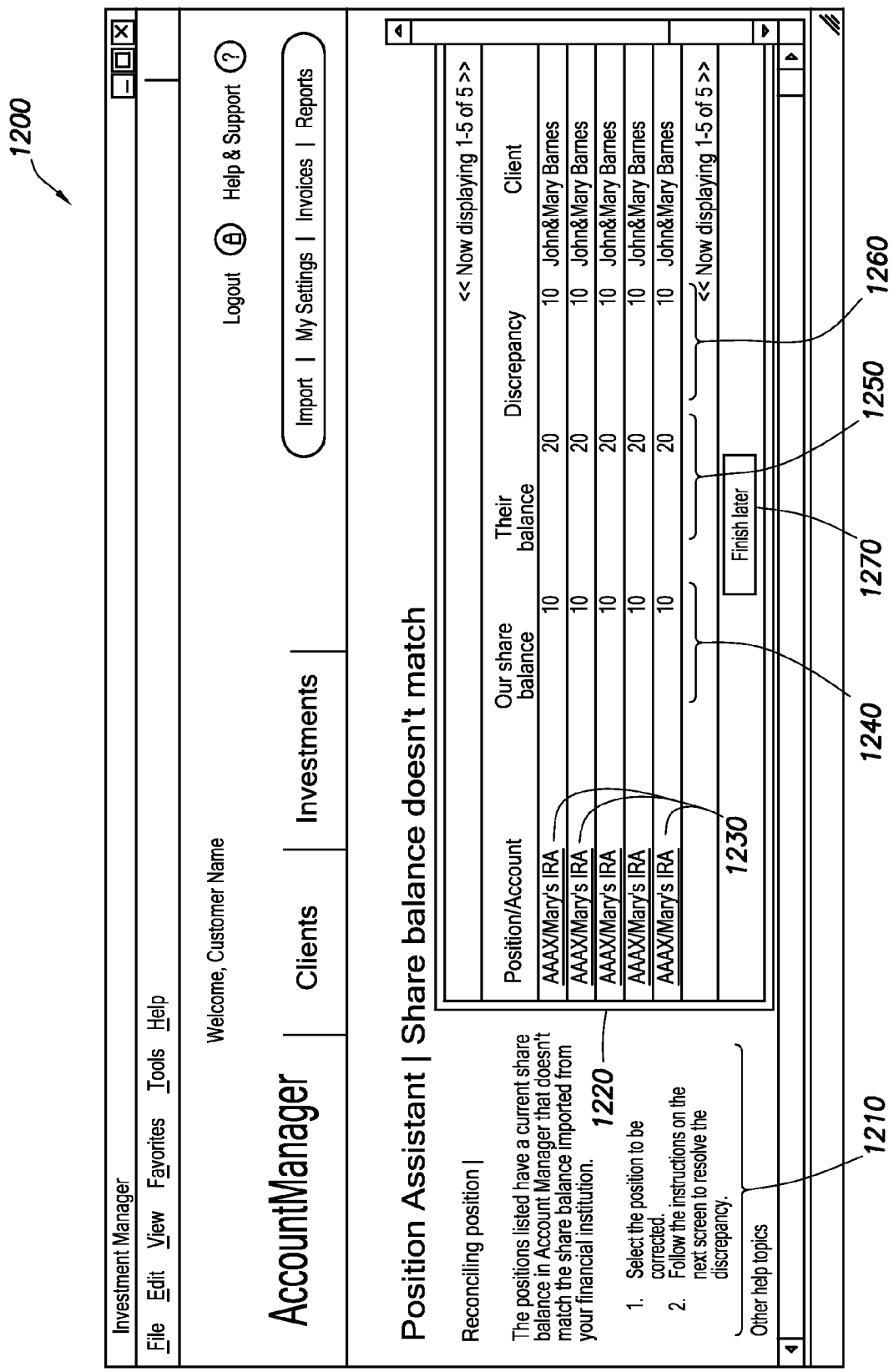
FIG. 12a illustrates a first user interface for reconciling mismatched share balances.

Alternately, the information downloaded from the financial institution may indicate a client share balance for a security that does not match the existing information in account management database 142. Account management system 140 detects such mismatches by comparing the downloaded position data to the existing position data in account management database 142. Returning to FIG. 6, the advisor may reconcile this type of mismatch by clicking link 654, which invokes screen 1200, as shown in FIG. 12*a*. The advisor is guided by specific instructions 1210 that indicate how to reconcile the mismatches. An account information area 1220 shows accounts 1230, the account balances 1240 according to account management database 142, and the corresponding downloaded balances 1250. The discrepancies 1260 between the sets of balances are also shown. Clicking on an account 1230 invokes screen 1250, shown in FIG. 12(*b*). Area 1260 provides guidance with specific instructions to the advisor as to how to reconcile the selected position. Alternately, dropdown list 1265 allows the user to select a different position. Area 1270 shows a list of all transactions for the selected position, both posted and in error, sorted by date. Column 1272 shows a running share balance. The discrepancy in the share balance is represented by Share balance adjustment transaction 1274, which the system creates on the date of a sale transaction. The user can select any transaction in the list and view the corresponding full information in area 1280, wherein the user may also edit, delete or add a transaction to correct the discrepancy. In this manner, the user may also attempt to reconcile erroneous or rejected transactions. With each correction or change, the user will see the running share balance change accordingly. In addition, Share balance adjustment transaction 1274 will change accordingly to make the balance correct on that day. For example, if the starting discrepancy is 10 shares, the adjustment will be +10 shares. If the Advisor enters a buy transaction of 5 shares, the adjustment will change to +5 shares. Once Share balance adjustment transaction 1274 reflects zero adjustment, the position has been reconciled. If desired, the amount of Share balance adjustment transaction 1274 can be left nonzero until a later time when additional reconciliation information is available. The user may save changes by clicking Save all changes button 1290. Alternately, the advisor may return to screen 600 without saving changes by clicking the Discard all changes button 1292. Share balance adjustment transaction 1274 will reflect the date of the last financial institution update for the position.

Figure 13A:
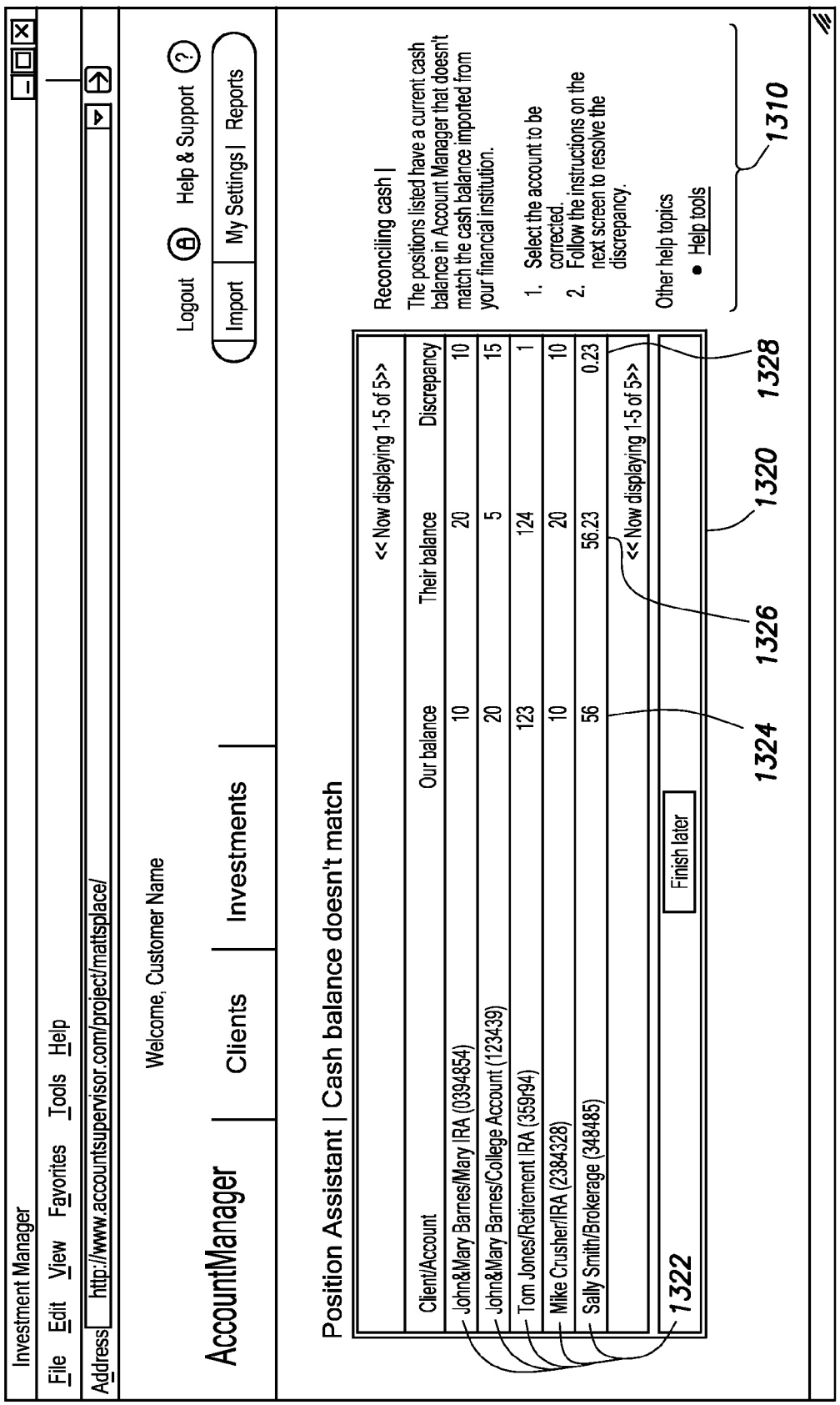
FIG. 13a illustrates a first user interface for reconciling mismatched cash balances.
Figure 13B:
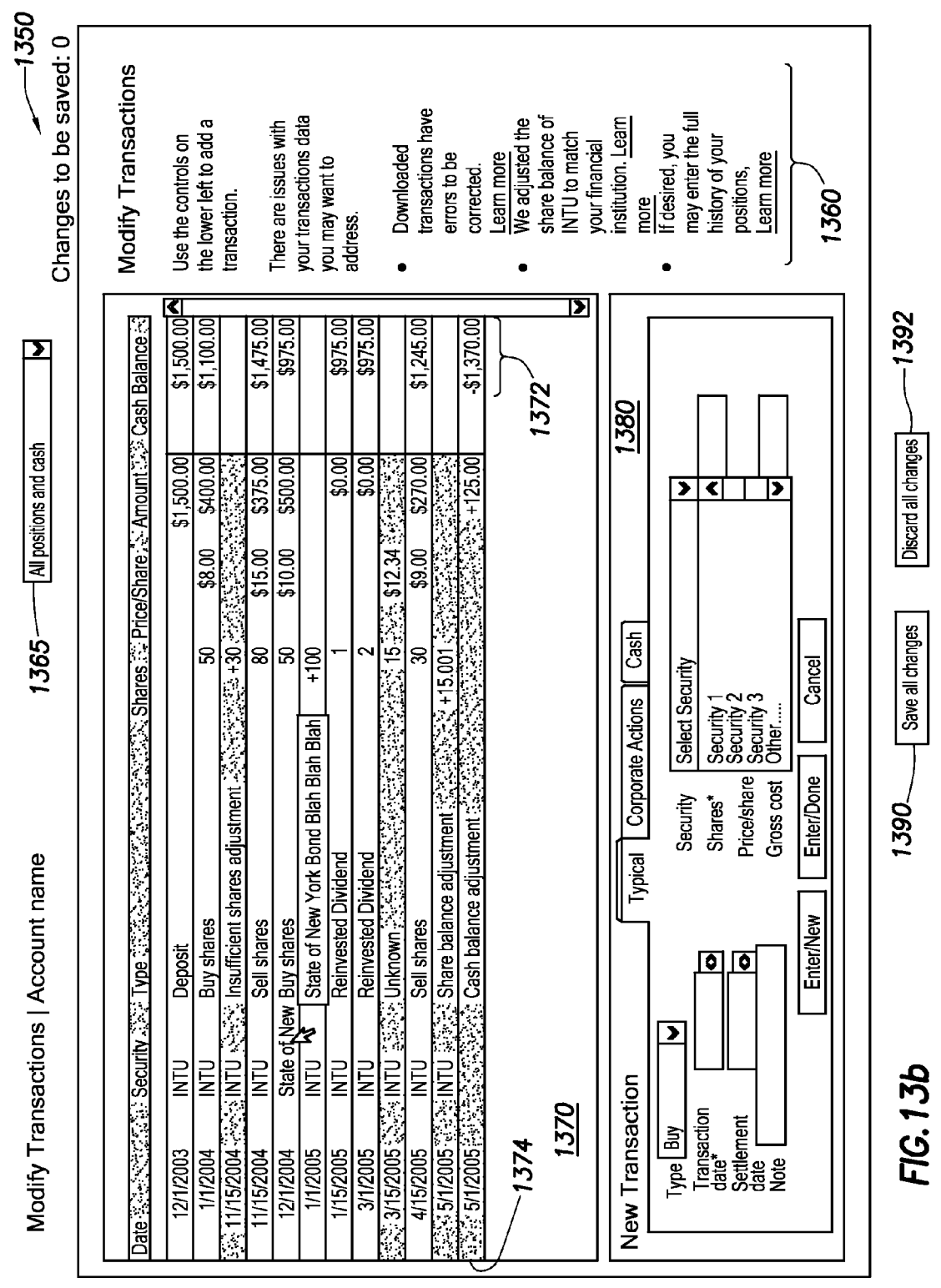

Alternately, the information downloaded from the financial institution may indicate a client cash balance that does not match the existing information in account management database 142. Account management system 140 detects such mismatches by comparing the downloaded balance data to the existing balance data in account management database 142. Returning to FIG. 6, the advisor may reconcile the mismatch by clicking link 656, which invokes screen 1300, as shown in FIG. 13*a*. The advisor is guided by specific instructions 1310 that indicate how to reconcile the mismatches. An account information area 1320 shows accounts 1322, the account balances 1324 according to account management database 142, and the corresponding downloaded balances 1326. The discrepancies 1328 between the sets of balances are also shown. Clicking on an account 1322, invokes screen 1350 of FIG. 13*b*, through which the user can resolve the respective discrepancy. Screen 1350 is similar to screen 1150. However, All positions and cash will be selected by default in dropdown list 1365, allowing the user to view and work with all transactions of an account, instead of only the transactions of a single position. The running cash balance is shown in column 1372. The cash discrepancy is shown as a cash balance adjustment that brings the cash balance to correct amount. For example, Cash balance adjustment 1374 in the amount of $125. has been entered to obtain the correct cash balance of $1,370. The user adds, edits or deletes transactions in area 1380 to compensate for the cash balance discrepancy. The Cash balance adjustment changes automatically to reflect the user's changes. Once the Cash adjustment equals zero, the problem has been reconciled. The user may save changes by clicking Save all changes button 1390. Alternately, the advisor may return to screen 600 without saving changes by clicking the Discard all changes button 1392.

Figure 14A:
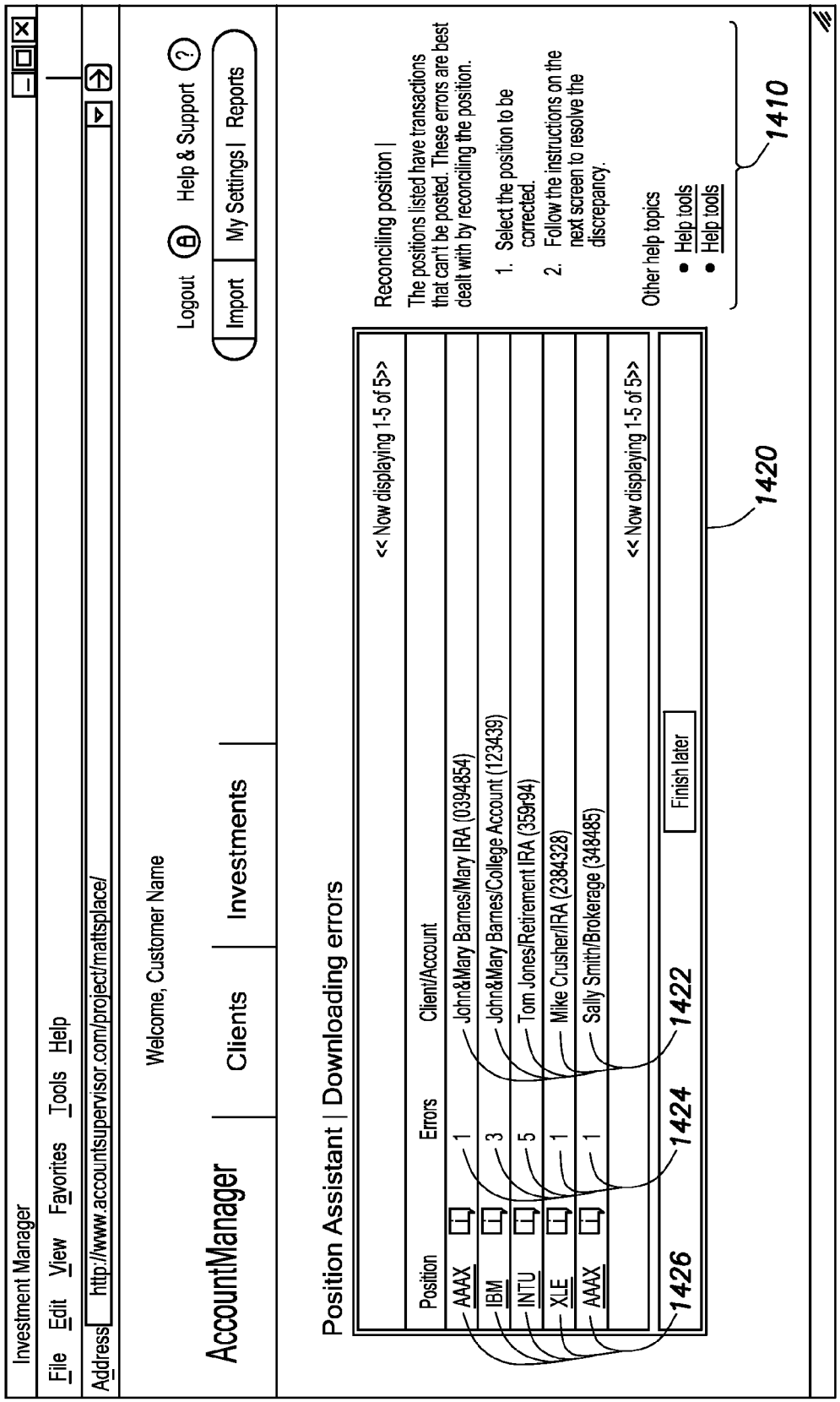
FIG. 14a illustrates a first user interface for reconciling downloading errors.

Alternately, the information downloaded from the financial institution may have become corrupted during the downloading process, or the user may have skipped a reconciliation step described above. Account management system 140 detects such conditions and allows the user to reconcile them according to the respective positions. Returning to FIG. 6, the advisor may reconcile mismatches that result from such a condition by clicking link 658, which invokes screen 1400, as shown in FIG. 14*a*. The advisor is guided by specific instructions 1410 that indicate how to reconcile the mismatches. An account information area 1420 shows accounts 1422 and the corresponding number of errors per account 1424. Clicking a link 1426 invokes screen 1450, shown in FIG. 14*b*. Using this screen, the user can resolve the respective discrepancy in the context of the transactions of the affected position. Area 1460 provides guidance with specific instructions to the advisor as to how to reconcile the selected position. Alternately, area 1460 may provide contact information to enable the user to obtain technical support. Dropdown list 1465 allows the user to select a different position, and area 1470 shows a list of all transactions for the selected position, both posted and in error, sorted by date. Column 1472 shows a running share balance.

Area 1470 may show a transaction for which information is corrupted or missing, such as transaction 1474, for which transaction type and amount are unavailable. Clicking the line that includes transaction 1474 displays details of the transaction within area 1480. By clicking buttons 1482, 1484 or 1486, the user may modify or delete the transaction, or may add a transaction, respectively, in order to reconcile the share balance. Once share adjustment 1476 equals zero, the position has been reconciled. If desired, adjustment 1476 can be left at a nonzero value until a later time when additional information is available to reconcile the problem. The user may save changes by clicking Save all changes button 1490. Alternately, the advisor may return to screen 600 without saving changes by clicking the Discard all changes button 1492. The adjustment transaction 1476 will reflect the date of the last financial institution update for the position.

Returning to FIG. 6, once the user has completed all reconciliation operations, he may select the Review tab 660 to view transactions that have been imported into account management system 140. This invokes screen 1500, shown in FIG. 15. The user is provided with explanatory guidance 1510. The user may select a particular transaction list using dropdown list 1520. Transaction information area 1530 summarizes the client accounts corresponding to the selected transaction list.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms. The present invention is well suited to a wide variety of computer network systems over numerous topologies, including large networks that comprise storage devices and computers that are communicatively coupled to dissimilar computers and storage devices, such as the Internet.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein.

Advantages of the present invention include an intelligent method and mechanism for efficiently and effectively resolving problems that arise when downloading data from financial institutions to databases of financial advisors. The method provides the advisor with automated assistance for recognizing and correcting errors in the downloaded data. This saves considerable time by eliminating the need for detailed problem diagnosis, manual repair and iterative reloading of files. The advisor is thereby freed to focus on core tasks and maximize value provided to clients.

Upon reading this disclosure, those of skill in the art will appreciate still additional alternative structural and functional designs and applications for a system and a process for intelligent reconciliation of database transfer errors through the disclosed principles of the present invention. For example, a similar method, system and user interface may be applied to the operations of uploading and reconciling inventory data received from multiple sources (e.g., warehouses, distribution facilities, retail outlets, franchisees, etc.) by an accounting facility. Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A method for reconciling transactional data for entry into an account management database, the account management database storing existing data, the method comprising:
receiving the transactional data characterized as belonging to a first problem category and a second problem category of a plurality of problem categories, wherein the first problem category and the second problem category each comprise at least two of a plurality of discrepancies that arise when reconciling the transactional data;
identifying a first discrepancy of the plurality of discrepancies between the transactional data and the existing data, wherein the first discrepancy is of a first type that includes incorrect transactional data in the first problem category of the plurality of problem categories;
identifying a second discrepancy of the plurality of discrepancies between the transactional data and the existing data, wherein the second discrepancy is of a second type that includes incorrect transactional data in the second problem category of the plurality of problem categories;
generating, using a processor of a computer, an ordered sequence based on at least the first discrepancy and the second discrepancy, wherein the ordered sequence comprises a first assistant configured to perform a first reconciling operation corresponding to the first type and a second assistant configured to perform a second reconciling operation corresponding to the second type, wherein the first assistant is adapted to assist a user in reconciling the first discrepancy and the second assistant is adapted to assist the user in reconciling the second discrepancy;
presenting the ordered sequence using the processor, the ordered sequence associated with:
a user interface including guidance to the user for reconciling the first discrepancy and the second discrepancy; and
a plurality of user interface elements adapted to receive, from the user, additional transactional data to change the incorrect transactional data and correct the plurality of discrepancies;
receiving the additional transactional data from the user through the plurality of user interface elements based on the guidance provided by the ordered sequence through the user interface;
generating, using the processor, reconciled transactional data by performing, using the additional transactional data received from the user, the first reconciling operation using the first assistant to reconcile the first discrepancy followed by the second reconciling operation using the second assistant to reconcile the second discrepancy; and
storing the reconciled transactional data in the account management database.

2. The method of claim 1, wherein the first reconciling operation comprises at least one of a group consisting of reconciling account information, reconciling securities information, reconciling transaction information, and reconciling position information.

3. The method of claim 2, wherein said reconciling account information comprises:
identifying an account number not represented in the existing data to generate an identified account number; and
displaying the user interface adapted to reconcile the identified account number with an existing account.

4. The method of claim 3, wherein the user interface comprises:
a link to descriptive information associated with the identified account number and extracted from the transactional data; and
a list of existing accounts from which an account may be chosen to correspond with an account associated with the identified account number.

5. The method of claim 4, wherein the user interface further comprises a field for entering account information to correspond with an account associated with the identified account number, the account information comprising at least one of a group consisting of an account type and an account name.

6. The method of claim 2, wherein said reconciling securities information comprises:

identifying a security not represented in the existing data to generate an identified security; and displaying the user interface adapted to reconcile the identified security with an existing security.

7. The method of claim 6, wherein the user interface comprises:

a link to descriptive information associated with the identified security and extracted from the transactional data; and a field for entering securities information to correspond with the identified security, the securities information comprising at least one of a group consisting of a security symbol, a security name, a security type, and a Committee on Uniform Securities Identification Procedures (CUSIP) number.

8. The method of claim 2, wherein said reconciling transaction information comprises:

identifying a transaction that requires an approval; and displaying the user interface adapted to accept the approval.

9. The method of claim 2, wherein said reconciling transaction information comprises:

identifying a transaction that contains the incorrect transactional data; and displaying the user interface adapted to accept the additional transactional data.

10. The method of claim 9, wherein the additional transactional data comprises at least one of a group consisting of a date, an amount, and a transaction type.

11. The method of claim 2, wherein said reconciling transaction information comprises:

identifying a transaction that requires a change in the existing data; and displaying the user interface adapted to accept the change in the existing data.

12. The method of claim 2, wherein said reconciling position information comprises:

identifying a transaction for which the existing data indicates insufficient funds; and displaying the user interface adapted to accept a change in the existing data.

13. The method of claim 2, wherein said reconciling position information comprises:

displaying the user interface adapted to show the first discrepancy between the transactional data and the existing data and to accept a change in at least one of a group consisting of the transactional data and the existing data.

14. The method of claim 13, wherein the transactional data comprises at least one of a group consisting of a position and a cash balance.

15. A non-transitory computer readable medium storing a computer program executable by a processor, the computer program implementing a method for reconciling transactional data for entry into an account management database, the account management database storing existing data, the method comprising:

receiving the transactional data characterized as belonging to a first problem category and a second problem category of a plurality of problem categories, wherein the first problem category and the second problem category each comprise at least two of a plurality of discrepancies that arise when reconciling the transactional data;

identifying a first discrepancy of the plurality of discrepancies between the transactional data and the existing data, wherein the first discrepancy is of a first type that includes incorrect transactional data in the first problem category of the plurality of problem categories;

identifying a second discrepancy of the plurality of discrepancies between the transactional data and the existing data, wherein the second discrepancy is of a second type that includes incorrect transactional data in the second problem category of the plurality of problem categories;

generating an ordered sequence based on at least the first discrepancy and the second discrepancy, wherein the ordered sequence comprises a first assistant configured to perform a first reconciling operation corresponding to the first type and a second assistant configured to perform a second reconciling operation corresponding to the second type, wherein the first assistant is adapted to assist a user in reconciling the first discrepancy and the second assistant is adapted to assist the user in reconciling the second discrepancy;

presenting the ordered sequence, the ordered sequence associated with:

a user interface comprising guidance to the user for reconciling the first discrepancy and the second discrepancy; and a plurality of user interface elements adapted to receive, from the user, additional transactional data to change the incorrect transactional data and correct the plurality of discrepancies; and receiving the additional transactional data from the user through the plurality of user interface elements based on the guidance provided by the ordered sequence through the user interface;

generating reconciled transactional data by performing, using the additional transactional data received from the user, the first reconciling operation using the first assistant to reconcile the first discrepancy and the second reconciling operation using the second assistant to reconcile the second discrepancy; and storing the reconciled transactional data in the account management database.

16. A computer implemented method for reconciling transactional data for entry into an account management database, the account management database storing existing data, the method comprising:

receiving the transactional data characterized as belonging to a first problem category and a second problem category of a plurality of problem categories, wherein the first problem category and the second problem category each comprise at least two of a plurality of discrepancies that arise when reconciling the transactional data;

identifying a first discrepancy of the plurality of discrepancies between the transactional data and the existing data, wherein the first discrepancy is of a first type that includes incorrect transactional data in the first problem category of the plurality of problem categories;

identifying a second discrepancy of the plurality of discrepancies between the transactional data and the existing data, wherein the second discrepancy is of a second type that includes incorrect transactional data in the second problem category of the plurality of problem categories;

generating, using a processor of a computer, an ordered sequence based at least on the first discrepancy and the second discrepancy, wherein the ordered sequence comprises a first assistant configured to perform a first reconciling operation corresponding to the first type and a second assistant configured to perform a second reconciling operation corresponding to the second type, wherein the first assistant is adapted to assist a user in reconciling the first discrepancy and the second assistant is adapted to assist a user in reconciling the second discrepancy;

presenting, using the processor, the ordered sequence and guidance to the user for reconciling the first discrepancy and the second discrepancy;

receiving a selection of the first assistant from the ordered sequence;

responsive to the selection of the first assistant from the ordered sequence, displaying a user interface adapted to receive additional transactional data from the user for performing the first reconciling operation using the first assistant;

receiving the additional transactional data from the user to perform the first reconciling operation using the first assistant to reconcile the first discrepancy;

responsive to reconciling the first discrepancy, updating the ordered sequence using the processor to generate a revised ordered sequence; and presenting the revised ordered sequence.

17. A computer system comprising:

a processor;

an account management system configured, using the processor, to:

receive transactional data characterized as belonging to a first problem category and a second problem category of a plurality of problem categories, wherein the first problem category and the second problem category each comprise at least two of a plurality of discrepancies that arise when reconciling the transactional data;

identify a first discrepancy of the plurality of discrepancies between the transactional data and the existing data, wherein the first discrepancy is of a first type that includes incorrect transactional data in the first problem category of the plurality of problem categories;

identify a second discrepancy of the plurality of discrepancies between the transactional data and the existing data, wherein the second discrepancy is of a second type that includes incorrect transactional data in the second problem category of the plurality of problem categories;

generate an ordered sequence based on at least the first discrepancy and the second discrepancy, wherein the ordered sequence comprises a first assistant configured to perform a first reconciling operation corresponding to the first type and a second assistant configured to perform a second reconciling operation corresponding to the second type, wherein the first assistant is adapted to assist a user in reconciling the first discrepancy and the second assistant is adapted to assist the user in reconciling the second discrepancy;

present the ordered sequence, the ordered sequence associated with:

a first user interface including guidance to the user for reconciling the first discrepancy;

a first plurality of user interface elements associated with the first user interface and adapted to receive first additional transactional data from the user;

a second user interface including guidance to the user for reconciling the second discrepancy; and a second plurality of user interface elements associated with the second user interface and adapted to receive second additional transactional data from the user;

generate reconciled transactional data by performing, using the first and second additional transactional data received from the user, the first reconciling operation using the first assistant to reconcile the first discrepancy and the second reconciling operation using the second assistant to reconcile the second discrepancy; and an account management database configured, using the processor, to:

receive the first additional transactional data from the first user interface and the second additional transactional data from the second user interface;

store the existing data in a computer readable medium;

store the transactional data in the computer readable medium; and store the reconciled transactional data in the computer readable medium.

\* \* \* \* \*